US011615370B1

(12) United States Patent
Li et al.

(10) Patent No.: US 11,615,370 B1
(45) Date of Patent: Mar. 28, 2023

(54) OPTIMIZED PACKAGE DELIVERY

(71) Applicant: Amazon Technologies, Inc., Seattle, WA (US)

(72) Inventors: Jin Li, Sammamish, WA (US); Xingang Guo, Bellevue, WA (US); Shao-Wen Yang, Redmond, WA (US); Kaushik Mani, Seattle, WA (US); Taru Roy, Mountain View, CA (US); Ahmet Can Musabeyoglu, Sunnyvale, CA (US); Gerald J. Nievera, North Las Vegas, NV (US)

(73) Assignee: Amazon Technologies, Inc., Seattle, WA (US)

( * ) Notice: Subject to any disclaimer, the term of this patent is extended or adjusted under 35 U.S.C. 154(b) by 777 days.

(21) Appl. No.: 16/435,177

(22) Filed: Jun. 7, 2019

(51) Int. Cl.
| | |
|---|---|
| *G06Q 10/08* | (2012.01) |
| *B60R 25/24* | (2013.01) |
| *G01C 21/34* | (2006.01) |
| *G06Q 30/06* | (2012.01) |
| *G06Q 50/30* | (2012.01) |
| *G07C 5/00* | (2006.01) |

(Continued)

(52) U.S. Cl.
CPC ....... *G06Q 10/08355* (2013.01); *B60R 25/24* (2013.01); *G01C 21/3492* (2013.01); *G06Q 30/0641* (2013.01); *G06Q 50/30* (2013.01); *G07C 5/008* (2013.01)

(58) Field of Classification Search
CPC ......... G06Q 10/08355; G06Q 30/0641; G06Q 50/30; B60R 25/24; G07C 5/008
USPC ....................................................... 705/338
See application file for complete search history.

(56) References Cited

U.S. PATENT DOCUMENTS

2012/0303531 A1* 11/2012 Betancourt ............ G06Q 20/18
    705/44
2014/0046585 A1* 2/2014 Morris, IV ............ G08G 1/205
    701/400

(Continued)

OTHER PUBLICATIONS

Coltin, Brian; "Multi-agent Pickup and Delivery Planning with Transfers"; The Robotics Institute, Carnegie Mellon University; May 2014. (Year: 2014).*

(Continued)

*Primary Examiner* — Resha Desai
*Assistant Examiner* — Dione N. Simpson
(74) *Attorney, Agent, or Firm* — Lee & Hayes, P.C.

(57) ABSTRACT

With respect to a package delivery system configured to optimize efficiencies associated with package delivery, a server computing device may monitor locations and conditions associated with a fleet of vehicles. A vehicle including a first delivery person may be dispatched with packages for delivery. The server computing device may provide updated delivery routes based on traffic and/or other conditions in the environment. At the completion of a work shift associated with the first delivery person, the vehicle may be parked at a location proximate the delivery route. The server computing device may dispatch a second delivery person to the location. Based on an indication that the second delivery person is proximate the vehicle, the server computing device may cause a user interface to surface on a computing device of the second delivery person, enabling the second delivery person to unlock the vehicle and continue delivering the packages.

20 Claims, 13 Drawing Sheets

(51) Int. Cl.
*G06Q 10/0835* (2023.01)
*G06Q 30/0601* (2023.01)

(56) References Cited

U.S. PATENT DOCUMENTS

| | | | |
|---|---|---|---|
| 2016/0099927 A1* | 4/2016 | Oz | G07C 5/0808 |
| | | | 726/9 |
| 2018/0103022 A1* | 4/2018 | Tokunaga | H04L 63/0853 |
| 2019/0016301 A1* | 1/2019 | Merkel | B60R 16/037 |
| 2019/0019149 A1* | 1/2019 | Dixon | G01C 21/343 |
| 2019/0043001 A1* | 2/2019 | Woulfe | G01C 21/3438 |
| 2019/0066183 A1* | 2/2019 | Fredrich | G06F 16/9537 |
| 2020/0307610 A1* | 10/2020 | Lerner | G07C 5/008 |

OTHER PUBLICATIONS

"Advanced Real-Time Car Tracking & Alert System", retrieved on May 2, 2019 at <<https://www.carlock.co/>>, 13 pages.
"Car Kay Remote in Smartphone App!", retrieved on May 2, 2019 at <<https://carchabi.com/ . . . , 6 pages.

* cited by examiner

400

```
┌─────────────────────────────────────────────────────────────────────┐
│  GENERATE A FIRST DELIVERY ROUTE FOR DELIVERING A FIRST SET OF      │
│  PACKAGES ASSOCIATED WITH A FIRST OPERATOR VIA A VEHICLE, THE       │
│  VEHICLE INCLUDING THE FIRST SET OF PACKAGES AND A SECOND SET OF    │
│  PACKAGES ASSOCIATED WITH A SECOND OPERATOR                         │
│                              402                                     │
└─────────────────────────────────────────────────────────────────────┘
                                    │
                                    ▼
┌─────────────────────────────────────────────────────────────────────┐
│  SEND THE FIRST DELIVERY ROUTE TO AT LEAST ONE OF A VEHICLE         │
│  COMPUTING DEVICE OR A FIRST OPERATOR COMPUTING DEVICE ASSOCIATED   │
│  WITH THE FIRST OPERATOR                                             │
│                              404                                     │
└─────────────────────────────────────────────────────────────────────┘
                                    │
                                    ▼
┌─────────────────────────────────────────────────────────────────────┐
│           DETERMINE THAT A FIRST DELIVERY ROUTE IS COMPLETE         │
│                              406                                     │
└─────────────────────────────────────────────────────────────────────┘
                                    │
                                    ▼
┌─────────────────────────────────────────────────────────────────────┐
│                DETERMINE A PARKING LOCATION FOR THE VEHICLE         │
│                              408                                     │
└─────────────────────────────────────────────────────────────────────┘
                                    │
                                    ▼
┌─────────────────────────────────────────────────────────────────────┐
│  SEND THE PARKING LOCATION TO A SECOND OPERATOR COMPUTING DEVICE    │
│  ASSOCIATED WITH THE SECOND OPERATOR AND THE AT LEAST ONE OF THE    │
│  VEHICLE COMPUTING DEVICE OR THE FIRST OPERATOR COMPUTING DEVICE    │
│                              410                                     │
└─────────────────────────────────────────────────────────────────────┘
                                    │
                                    ▼
┌─────────────────────────────────────────────────────────────────────┐
│  SEND A SECOND DELIVERY ROUTE FOR DELIVERING A SECOND SET OF        │
│  PACKAGES ASSOCIATED WITH THE SECOND OPERATOR TO THE VEHICLE        │
│  COMPUTING DEVICE OR THE SECOND OPERATOR COMPUTING DEVICE           │
│                              412                                     │
└─────────────────────────────────────────────────────────────────────┘
```

GENERATE A DELIVERY ROUTE FOR A DELIVERY VEHICLE BASED AT LEAST IN PART ON DELIVERY LOCATIONS ASSOCIATED WITH PACKAGES SCHEDULED FOR DELIVERY AND A CONDITION IN THE ENVIRONMENT AT A FIRST TIME
602

SEND THE DELIVERY ROUTE TO AT LEAST ONE OF AN OPERATOR COMPUTING DEVICE OR A VEHICLE COMPUTING DEVICE
604

IDENTIFY A TRAFFIC DELAY PROXIMATE THE DELIVERY ROUTE AT A SECOND TIME
606

GENERATE AN UPDATED DELIVERY ROUTE BASED AT LEAST IN PART ON THE TRAFFIC DELAY
608

SEND THE UPDATED DELIVERY ROUTE TO THE AT LEAST ONE OF THE OPERATOR COMPUTING DEVICE OR THE VEHICLE COMPUTING DEVICE
610

FIG. 6

OPTIMIZED PACKAGE DELIVERY

BACKGROUND

A significant number of goods are purchased via ecommerce for delivery directly to consumers. Oftentimes, the goods are stored at a storage warehouse and delivered to the consumers via a fleet of delivery vehicles. Traditionally, a delivery vehicle operator may check out a vehicle at the start of a shift, such as by accessing a key associated therewith from a location associated with a central vehicle management system. The delivery vehicle operator may load the vehicle at the storage warehouse with a first load of packages to deliver during the delivery vehicle operator's shift. The delivery vehicle operator may drive the route, deliver the packages, and may return to the central vehicle management location at the end of the shift. Thereafter, another delivery vehicle operator may check out the vehicle from the central vehicle management location and deliver a second load of packages. However, this traditional method may be inefficient due to the time required to transit to and from the central vehicle management location.

Additionally, traditional methods of package delivery include a first delivery vehicle operator returning the key associated with the delivery vehicle at the end of a work shift. A second delivery vehicle operator may check out the key and begin a second delivery route to deliver the second load of packages. Accordingly, the continued operation of a delivery vehicle may be dependent upon the safe return of the key. However, vehicle keys are often lost or broken. In a traditional package delivery system, a lost or broken key would render the delivery vehicle unable to conduct deliveries.

Furthermore, many central vehicle management systems provide the delivery vehicle operator with a delivery route based on the packages loaded into the delivery vehicle. The delivery route may include an order for package delivery, such as an instruction to deliver a first package to a first delivery location, followed by a second package to a second delivery location, and so on. However, because the delivery route is determined based on the delivery locations alone, the delivery route may not include the most efficient route through a dynamic environment, such as due to traffic, construction zones, etc.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 4 illustrates a flow diagram of an example process for coordinating continuous use of a delivery vehicle.

FIG. 6 illustrates a flow diagram of an example process for generating an updated delivery route based on an identified traffic delay.

DETAILED DESCRIPTION

Figure 1:
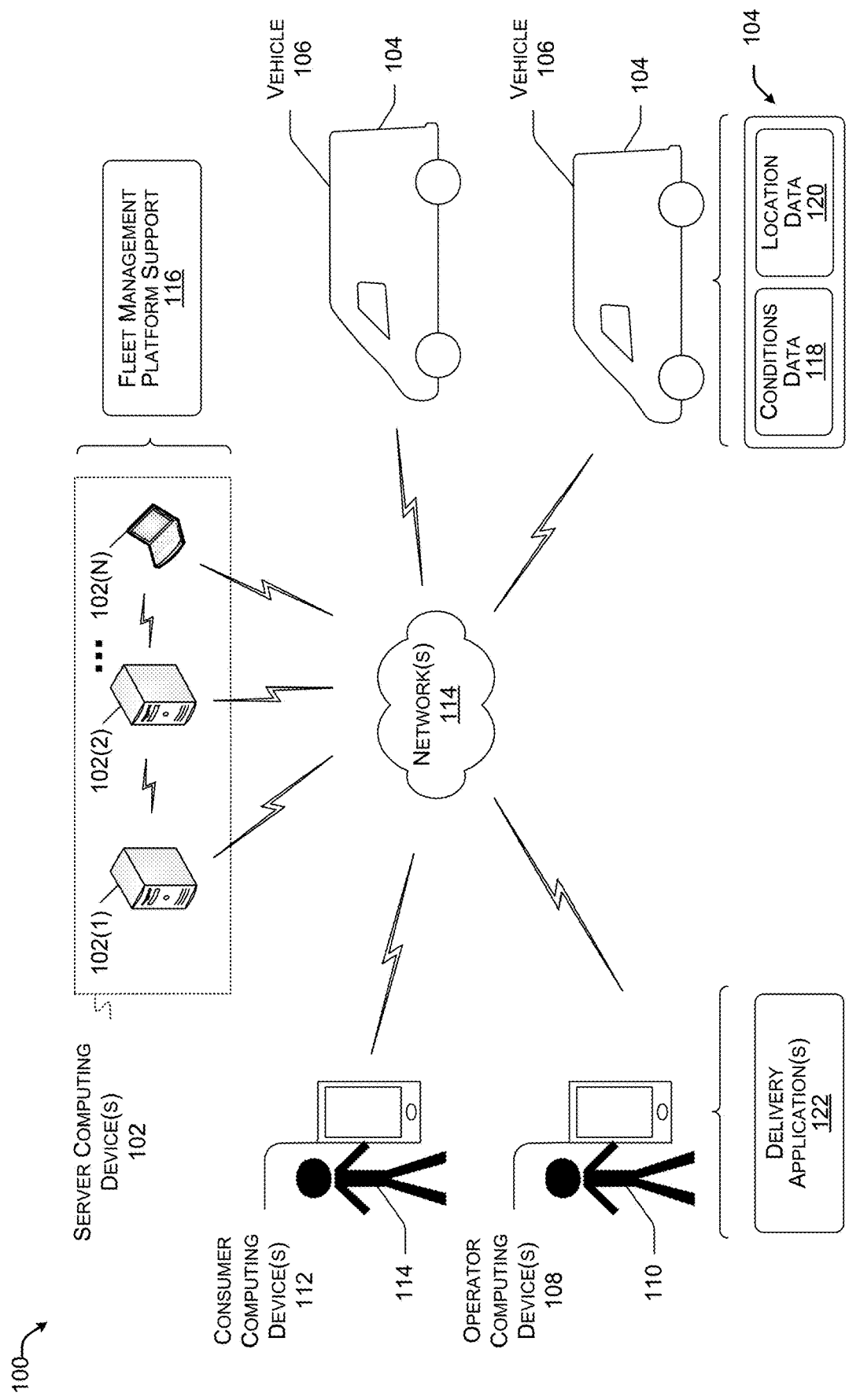
FIG. 1 illustrates an example package delivery system.

This application describes systems and techniques for optimizing package delivery via a fleet of delivery vehicles. The techniques described herein may maximize a number of packages capable of being delivered via a delivery vehicle of the fleet of delivery vehicles. The increased efficiencies and capabilities associated with package delivery described herein may include significant improvements over traditional package delivery service systems.

An optimized package delivery system ("delivery system") may include a server computing device configured to manage the fleet of vehicles. Each vehicle of the fleet of vehicles may include one or more packages associated with one or more delivery people (e.g., delivery vehicle operators). The server computing device may be configured to communicate with a vehicle computing device to monitor a location of the vehicle, a status of the vehicle (e.g., on duty (e.g., transiting between delivery locations, at a delivery location, etc.), off duty (e.g., at a refueling/recharging station, parked and awaiting a next operator)), one or more vehicle conditions (e.g., an amount of fuel, battery charge remaining, tire pressure, vehicle diagnostics, etc.), or the like. The vehicle computing device may be configured to communicate with one or more vehicle systems via a coupling. In at least one example, the vehicle computing device may be configured to couple to the vehicle and access the one or more vehicle conditions via an onboard diagnostics (OBD) port. In other examples, the vehicle computing device may couple to the vehicle via a universal serial bus (USB) port or other wired connection port, and/or a wireless connection.

In various examples, the server computing device may provide a delivery vehicle operator (e.g., driver, delivery person, etc.) (hereinafter "operator") with an initial route for delivery. In some examples, the initial route may be presented to the operator on an operator computing device, such as via a delivery application. In such examples, the initial route may be presented on a display of the operator computing device. In some examples, the operator computing device may be configured to cause the initial route to be presented on a display of the vehicle (e.g., navigation display), such as via a wired or wireless connection.

In some examples, the server computing device may provide the initial route to the vehicle computing device. In such examples, the vehicle computing device may cause the initial route to be presented on the display of the vehicle. In examples in which the delivery vehicle is an autonomous vehicle, the vehicle computing device may cause one or more drive systems to operate the vehicle the initial route. The initial route may include an order in which the packages should be delivered to maximize efficiency in delivery. In various examples, the server computing device may determine the order based at least in part on a time of day, a day of the week, traffic considerations, planned construction zones, road blockages, or the like. For example, the initial route on a Monday morning at 8:00 am may include a first set of deliveries in a suburb and a second set of deliveries in the suburb, after traffic from a morning commute has abated.

In various examples, the server computing device may be configured to monitor the location of the vehicle throughout a delivery route and determine one or more updated routes due to conditions present in the environment (e.g., environmental conditions). The server computing device may receive location data from the vehicle computing device, such as via a GPS or other tracking system associated therewith. The environmental conditions may include traffic, accidents, construction, or any other conditions that impact the delivery vehicle progress along the delivery route. For example, the server computing device may determine that the delivery vehicle is falling behind schedule due to an unexpected construction zone slowing traffic. The server computing device may identify an updated delivery route for the delivery vehicle to avoid the construction zone and optimize efficiency of the delivery route. In various examples, the updated route may include a change to the order in which the packages were originally ordered for delivery. In some examples, the updated route may include a change in a path the delivery vehicle travels between delivery locations. In various examples, the server computing device may provide the updated route to the vehicle computing device and/or the operator computing device for presentation to the operator. In some examples, the vehicle computing device may cause one or more drive systems to operate the vehicle along the updated route.

In various examples, the server computing device may monitor a total number of packages and/or contents therein remaining in the delivery vehicle. In some examples, the delivery vehicle may include additional packages other than the packages associated with the scheduled delivery routes. In such examples, the additional packages may include non-perishable goods (e.g., items) that are frequently ordered (e.g., ordered at a rate equal to or greater than a threshold ordering rate). In some examples, the server computing device may receive an order for an item from a consumer computing device associated with a consumer. The server computing device may determine that a delivery location associated with the order is proximate the delivery route (e.g., initial route, updated route, etc.) of the delivery vehicle and that the delivery vehicle includes the item as one of the additional packages located therein. The server computing device may send the operator computing device and/or the vehicle computing device a notification that an additional delivery location has been added to the delivery route. In some examples, the notification may include information about the additional package to enable the operator to locate the package in the delivery vehicle. In some examples, the notification may include information about a delivery associated with the additional package, such as the delivery location, an estimated additional time added to the delivery route based on the additional delivery, an updated route based on the additional delivery, or the like.

In various examples, the server computing device may determine that a delivery route has been completed. In some examples, the server computing device may determine route completion based on an indication that the operator has delivered the last package (e.g., a final package remaining from the packages associated with the operator). The indication may be provided to the server computing device from the operator computing device, such as via the delivery application. For example, the operator may scan the last package and input an indication that the last package has been delivered to the associated delivery location. In some examples, the server computing device may determine route completion based on a determination that a shift (e.g., work shift, work day) associated with the operator is complete or is within a threshold time of completion. In some examples, the threshold time may correspond to a time required for another package delivery. For example, the server computing device may determine that the operator is scheduled to complete a shift at 4:00 pm and a current time is 3:50 pm. The server computing device may determine that the ten minutes remaining in the shift is insufficient to deliver another package. Accordingly, the server computing device may determine that the delivery route associated with the operator is complete.

In various examples, based on determining that the delivery route is complete, the server computing device may provide the operator and/or the vehicle computing device with an instruction to deliver the vehicle to a parking location. The parking location may include a location where the delivery vehicle may be parked, locked, and left by the operator. In some examples, the parking location may include a location at which the operator may end the delivery route and/or a shift (e.g., work shift) associated therewith. In some examples, the parking location may include a location proximate to the delivery location associated with the last package delivered by the operator and/or a location proximate to a delivery location associated with a first package to be delivered by another operator.

In various examples, the server computing device may provide the parking location to the other operator (e.g., second operator) as a location associated with where the second operator will start a delivery route and/or a shift associated therewith. In such examples, the server computing device may additionally provide a second operator computing device with an identifier associated with the vehicle and/or vehicle computing device, to ensure the second operator locates the appropriate vehicle. In some examples, the server computing device may provide the vehicle computing device an identifier associated with the second operator. In such examples, the vehicle computing device may be configured to determine that the second operator is an appropriate operator of the vehicle.

In some examples, the vehicle computing device may transmit a signal including the identifier associated with the vehicle and/or vehicle computing device. The signal may include a Bluetooth signal or other wireless signal capable of transmitting the identifier. The vehicle computing device may be configured to identify the second operator based on receipt of a Bluetooth or other signal transmitted by a second operator computing device. In some examples, the vehicle computing device may identify the second operator, such as based on an operator identifier included in the signal transmitted by the second operator computing device, and may send a message to the server computing device with an indication that the second operator is in proximity to the delivery vehicle. In some examples, based on the indication that the second operator is in proximity to the delivery vehicle, the server computing device may cause a user interface to surface on the second operator computing device, such as via the delivery application. The user interface may include a vehicle unlock option, permitting the second operator to indicate an intent to unlock and access the delivery vehicle.

The server computing device may receive an indication that the second operator selected the vehicle unlock option and may send an instruction to the vehicle computing device to unlock the vehicle. In some examples, based on receipt of the instruction, the vehicle computing device may cause the vehicle to unlock. In some examples, the vehicle computing device may cause the vehicle to unlock by transmitting a radio frequency (RF) signal corresponding to the vehicle locking system. In some examples, the vehicle computing system may cause the vehicle to unlock, such as via a smart key system. The second operator may access the vehicle and begin a second delivery route provided by the server computing device, such as the initial and/or updated delivery routes described above.

In various examples, the server computing device may monitor the one or more vehicle conditions (e.g., an amount of fuel, battery charge remaining, tire pressure, vehicle diagnostics, etc.) during delivery vehicle operation via the vehicle computing device. In such examples, the server computing device may be configured to determine when a delivery vehicle requires service or should be otherwise taken off-duty. In some examples, the vehicle computing device may send fuel and/or battery charge information to the server computing. The fuel and/or battery charge information may be sent continuously while in operation, periodically (e.g., every 15 minutes, every hour, etc.), and/or at one or more predetermined fuel and/or battery charge levels (e.g., 50% full, 25% full, 10% full, based on an illumination of a low fuel light, etc.).

In various examples, based on receipt of the fuel and/or battery charge information, the server computing device may include a fuel stop along a current delivery route associated with the delivery vehicle. In some examples, the server computing device may identify one or more fueling and/or charging stations along the current delivery route. In some examples, the fueling and/or charging station(s) may include station(s) configured to communicate with the vehicle computing device, operator computing device, and/or server computing device, such as to facilitate verification of the delivery vehicle and to coordinate payment. As used herein, a "fueling station" may be configured for vehicle fueling (e.g., gas) and/or charging (e.g., electricity).

In some examples, the server computing device may select a fueling station and provide the information to the second operator. In such examples, the server computing device may select the fueling station based on a proximity to the delivery route, ease of entering/exiting the fueling station, a current wait time for a fuel pump and/or battery charger, or the like. In some examples, the server computing device may provide information about the fueling station(s) to the second operator for selection of a particular fueling station by the second operator.

In various examples, the server computing device may determine that the vehicle is located within a threshold distance (e.g., 3 feet, 5 feet, 2 meters, etc.) of a pump or plug associated with a fueling station, respectively. The location may be based on location information provided by the GPS and/or another location component associated with the vehicle computing device and/or a location component associated with the second operator computing device. In some examples, based on a determination that the vehicle and/or operator is located at the pump or plug, the server computing device may cause a payment user interface associated with a payment function to surface on the second operator computing device. In some examples, the second operator may access the payment user interface associated with the payment function of the delivery application or another application on the second operator computing device. In some examples, responsive to receiving a request for the second operator to access the payment user interface, the server computing device may verify that the location of the delivery vehicle is within the threshold distance of the pump or plug. In such examples, the server computing device may enable access to the payment user interface on the second operator computing device.

In various examples, the payment user interface may enable the second operator to pay for the fuel and/or charge associated with the delivery vehicle. In such examples, the payment user interface may include a near field communication or other contactless payment transmission, or the like. In some examples, the vehicle computing system may be configured to periodically or continuously send an indication of the fuel and/or charge level of the vehicle during fueling and/or charging operations. In such examples, the server computing device may be configured to verify fueling and/or charging of the delivery vehicle. In some examples, the server computing device may pre-authorize an initial amount of fuel and/or charge (e.g., 1 gallon, 100 Watts, $5.00, etc.) for the delivery vehicle. In such examples, based on a verification that the delivery vehicle is being fueled, the server computing device may authorize a full amount for the fuel and/or charge.

In various examples, a computing device associated with the fueling station may be configured to identify the delivery vehicle at the pump or plug, such as via the Bluetooth signal transmitted by the vehicle computing device and vehicle identifier associated therewith. In such examples, the computing device associated with the fueling station may determine a cost for the fuel and/or charge associated with the delivery vehicle and send a request for payment to the server computing device. The server computing device may be configured to coordinate payment for the fuel and/or charge.

In various examples, the vehicle computing device may send a message to the server computing device indicating that the fueling and/or charging is complete (e.g., delivery vehicle has been fully fueled and/or charged). In some examples, the server computing device may determine that fueling and/or charging is complete based on a determination that a location associated with the delivery vehicle has changed. In some examples, based on an indication that the fueling and/or charging is complete, the server computing device may update the delivery route, such as based on current environmental conditions, and send the updated route to the vehicle computing device and/or second operator computing device. The second operator may continue along the delivery route until the delivery route and/or shift associated therewith is complete.

FIG. 1 illustrates an example delivery system 100 including one or more server computing devices 102, one or more vehicle computing devices 104 associated with one or more delivery vehicles 106, one or more operator computing devices 108 associated with one or more operators 110, and one or more consumer computing devices 112 associated with one or more consumers 114. In some examples, the server computing devices 102(1), 102(2), and 102(N) may be configured to communicate with other devices in a distributed computing resource.

In various examples, the server computing device(s) 102, the vehicle computing device(s) 104, the operator computing device(s) 108, and/or the consumer computing device(s) 112 may include a variety of device types configured to communicate via one or more networks 114 and are not limited to a particular type of device. In some examples, the server computing device(s) 102, the vehicle computing device(s) 104, the operator computing device(s) 108, and/or the consumer computing device(s) 114 may include stationary devices, including but not limited to servers, desktop computers, personal computers, work stations, and thin clients, such as those capable of operating in a distributed computing resource. In some examples, server computing device(s) 102, the vehicle computing device(s) 104, the operator computing device(s) 108, and/or the consumer computing device(s) 114 may include mobile devices, including but not limited to mobile phones, tablet computers, laptop computers, and any other mobile computers or mobile telecommunication devices. In various examples, server computing device(s) 102, the vehicle computing device(s) 104, the operator computing device(s) 108, and/or the consumer computing device(s) 114 may include any other sort of computing device configured to communicate via the one or more networks 114.

In various examples, network(s) 114 may include public networks such as the internet, private networks such as an institutional and/or personal network or some combination of public and private networks. Network(s) 114 may also include any type of wired and/or wireless network, including but not limited to near-field communication (NFC), personal area networks (PAN) (e.g., Bluetooth, ZigBee, etc.), local area networks (LAN), wide area networks (WAN), satellite networks, cable networks, Wi-Fi networks, WiMax networks, mobile communications networks (e.g., 3G, 4G, etc.), or any combination thereof. Network(s) 114 may utilize communications protocols, including packet-based and/or datagram-based protocols, such as internet protocol (IP), transmission control protocol (TCP), user datagram protocol (UDP), or other types of protocols. Moreover, network(s) 114 may also include a number of devices that facilitate network communications and/or form a hardware basis for the networks, such as switches, routers, gateway access points, firewalls, base stations, repeaters, backbone devices, and the like.

In some examples, network(s) 114 may further include devices that may enable connection to a wireless network, such as a wireless access point (WAP). The examples which support connectivity through WAPs send and receive data over various electromagnetic frequencies (e.g., radio frequencies), including WAPs that support Institute of Electrical and Electronics Engineers (IEEE) 802.11 standards (e.g., 802.11g, 802.11n, and so forth) and other standards.

In various examples, the server computing device(s) 102 may include a fleet management platform support 116 for managing the delivery vehicle(s) 106. A delivery vehicle 106 may include an autonomous vehicle, a semi-autonomous vehicle, and/or a manned vehicle configured for package delivery. In the illustrated example, the delivery vehicle(s) 106 include vehicles configured with wheels for transiting on a road system. In other examples, a delivery vehicle 106 may additionally or alternatively be configured as an aerial platform, such as an unmanned aerial vehicle. In examples in which the delivery vehicle 106 is autonomous, the operator 110 may travel in the delivery vehicle 106 to deliver packages. In various examples, the operator 110 may include a delivery robot. In such examples, the package delivery system may be fully automated, such as with an automated delivery vehicle 106 and an automated delivery robot.

For the purpose of illustration, the delivery vehicles 106 may comprise a fleet (e.g., a platoon) of multiple delivery vehicles 106, each of which being configured to communicate the conditions data 118 and location data 120 to the server computing device(s) 102. The conditions data 118 may include one or more vehicle conditions (e.g., an amount of fuel, battery charge remaining, tire pressure, vehicle diagnostics, etc.) associated with the vehicle 106. The vehicle computing device 104 may determine the vehicle condition(s) based on data received from an internal computer of the vehicle 106. The vehicle computing device 104 may be coupled to the internal computer via an onboard diagnostic (OBD) port of the vehicle 106 and/or via one or more other wired or wireless connections (e.g., USB port, wi-fi connection, etc.). The location data 120 may include a location associated with the vehicle computing device 104 (and the vehicle 106). The vehicle computing device 104 may determine the location data from one or more location components associated with the vehicle computing device 104. In at least one example, the location component(s) may include a GPS device.

A vehicle 106 of the fleet may include a manned vehicle, a semi-autonomous vehicle, or an autonomous vehicle configured to operate in an environment for package delivery. The vehicle 106 may be configured to carry a plurality of packages scheduled for delivery (e.g., purchased by consumer(s) 114 via consumer computing device(s) 112 prior to loading the vehicle 106). The plurality packages may include groups of packages to be delivered by different delivery people (e.g., vehicle operator, operator, etc.). For example, the vehicle 106 may include a first group of packages scheduled to be delivered by a first operator, a second group of packages scheduled to be delivered by a second operator, and a third group of packages scheduled to be delivered by a third operator.

Additionally or alternatively, the plurality of packages may include a group of packages containing frequently purchased items. The frequently purchased items may include items that are purchased by consumers located in the operating environment (e.g., in a city, suburb, operating area, etc.). In some examples, the frequently purchased items may include perishable goods. In such examples, the frequently purchased items may be stored in a refrigeration or other compartment of the vehicle 106 to prevent the goods from going stale and/or perishing. In some examples, the frequently purchased items may include non-perishable goods. In some examples, the frequently purchased items may be carried in the vehicle 106 to enable a spontaneous delivery (e.g., not scheduled prior to vehicle 106 dispatch).

In various examples, the vehicle 106 may be dispatched for delivery from a central vehicle management location. In some examples, the central vehicle management location may include a location at which the packages are loaded into the vehicle 106, such as a storage warehouse. In some examples, the central vehicle management location may include a location separate from the storage warehouse. In such examples, an operator of the vehicle 106 at dispatch may operate the vehicle to the storage warehouse for package loading. In examples in which the vehicle 106 is an autonomous vehicle, one or more drive system(s) associated therewith may be configured to cause the vehicle to operate to the storage location for package loading.

The server computing device(s) 102 may monitor each of the plurality of packages loaded into the vehicle 106. In various examples, the server computing device(s) 102 may determine a delivery route for the operator based on a group of packages associated therewith. The delivery route may include a stop associated with each package of the group of packages (e.g., 10 packages, 15 packages, etc.). A number of packages included in a group may be based on distances between delivery locations associated therewith, a work shift associated with the operator, and/or other factors. The delivery route may be determined based on the delivery locations associated with the packages and one or more environmental conditions that may impact an efficiency of operation. The environmental condition(s) may include a time of day, day of the week, traffic conditions, construction zones, road blocks, active school zones, and/or other conditions in environment prior to dispatch. In at least one example, the delivery route may include a most efficient route for delivery based on the environmental condition(s).

The server computing device(s) 102 may provide the delivery route to the operator computing device 108 and/or the vehicle computing device 104. In various examples, the operator computing device 108 may include one or more applications 122 configured to receive and display the delivery route. In various examples, based on receipt of the delivery route, the operator computing device 108 may present the delivery route on a display of the operator computing device 108 and/or a display associated with the vehicle 106, such as a navigation display. For example, the operator computing device 108 may receive the delivery route and may send the delivery route information via a Bluetooth connection to a navigation display associated with the vehicle 106. In such an example, the operator 110 may be able to view the delivery route via a larger display than that associated with the operator computing device 108, thus enhancing safety. In some examples, based on receipt of the delivery route, the vehicle computing device 104 may cause the delivery route to be presented on the display of the vehicle 106. For example, the vehicle computing device 104 may send the delivery route information via the OBD port to the internal computer of the vehicle 106 with an instruction to present the delivery route via the navigation display.

As will be discussed in greater detail with regard to FIG. 2, the server computing device(s) 102 may be configured to monitor a location associated with the vehicle 106 and the environmental condition(s) to determine a traffic delay along the delivery route. A traffic delay may be based on traffic build-up, an unanticipated (e.g., unknown prior to dispatch) construction zone, or other obstruction along the delivery route. In some examples, the server computing device(s) 102 may be configured to determine an updated route to avoid and/or lessen the impact of the traffic delay on the delivery route. In some examples, the updated route may include a change to an order in which the packages of the group of packages are delivered. For example, an initial delivery route may include a first package being delivered first and a second package being delivered second and an updated delivery route may include the second package being delivered first and the first package being delivered second. In some examples, the updated route may include one or more different roads on which the vehicle 106 may operate to deliver the packages. The server computing device(s) 102 may provide the updated delivery route to the operator computing device 108 and/or the vehicle computing device 104 for the vehicle 106 to follow.

In various examples, the server computing device(s) 102 may be configured to receive one or more orders for delivery from the one or more consumers 114 via the one or more consumer computing devices 112 after vehicle dispatch (e.g., unscheduled delivery). In some examples, the order(s) may include orders for one or more frequently purchased items. In various examples, the server computing device(s) 102 may determine that a delivery location associated with an order received after vehicle dispatch is proximate a delivery route (e.g., within a threshold distance, inclusion of the delivery location will add less than a threshold amount of time to the delivery route, etc.) associated with the vehicle 106 and that an item purchased in the order is a frequently ordered item that is loaded in the vehicle 106. Based on a determination that the delivery location is proximate the delivery route and that the item is located in the vehicle 106, the server computing device(s) 102 may update the delivery route. The server computing device may provide the updated delivery route to the vehicle computing device and/or the operator computing device 108. Additionally, the server computing device may send a notification to the operator computing device 108, such as in a push notification, to provide information about the spontaneous delivery (e.g., delivery location, item purchased, location of package containing the item within the vehicle 106, additional time associated with the delivery, etc.).

In various examples, the server computing device(s) 102 may monitor the packages that have been delivered and/or the packages remaining in the vehicle 106. In some examples, the operator computing device 108 may provide data associated with package deliveries to the server computing device 102, such as via the application(s) 122. In some examples, the server computing device(s) may monitor a time associated with a work shift of an operator 110. In various examples, the server computing device(s) 102 may determine that a delivery route is complete. In some examples, a determination of route completion may be based on receiving an indication that the operator 110 has delivered a last package (e.g., a final package remaining from the packages associated with the operator) of a group of packages corresponding to the operator. In such examples, the server computing device(s) 102 may receive the indication from the operator computing device 108. In some examples, the server computing device(s) 102 may determine route completion based on a determine that the work shift of the operator 110 is complete or within a threshold time of completion. In some examples, the threshold time may be pre-determined amount of time. In some examples, the threshold time may be dynamically determined, such as based on a time required to deliver a next package.

In some examples, based on a determination that the route is complete, the server computing device(s) 102 may provide the operator 110 (via the operator computing device 108) and/or the vehicle computing device 104 an instruction to deliver the vehicle to a parking location (e.g., stopping location). In such examples, the server computing device(s) 102 may provide data corresponding to the parking location to the operator computing device 108 and/or the vehicle computing device 104. The parking location may include a location where the delivery vehicle may be parked, locked, and left by the operator 110. In various examples, the parking location may be determined based security associated with the parking location, proximity to a delivery route, or the like. In some examples, based on a determination that the vehicle 106 has arrived at the parking location, the vehicle computing device 104 and/or operator 110 (via the operator computing device 108) may provide an indication to the server computing device 102 that the vehicle 106 is at the parking location.

In some examples, the server computing device(s) 102 may provide the parking location to a subsequent operator, such as via an instance of the application(s) 122 on a second operator computing device 108. In such examples, the subsequent operator ("second operator") may arrive at the parking location in order to begin a work shift associated therewith. The server computing device(s) 102 may additionally provide the second operator 110 with an identifier associated with the vehicle 106 and/or details associated with a second delivery route associated with the second operator 110 (e.g., hours associated with work shift, number of scheduled deliveries, second delivery route information, etc.).

In various examples, the vehicle computing device 104 may be configured to determine that a second operator computing device associated with the second operator 110 is within a threshold distance of the vehicle 106. In various examples, the vehicle computing device 104 may receive information corresponding to the second operator from the server computing device. In some examples, the information may include an identifier (e.g., employee identification number, operator computing device name and/or identification number, an operator name, a scheduled work shift start time, etc.).

In some examples, the vehicle computing device 104 may be configured to transmit a signal, such as a Bluetooth signal or other signal including an identifier associated with the vehicle 106. In various examples, the vehicle computing device 104 may be configured to receive signals, such as Bluetooth signals, from one or more other computing devices. The vehicle computing device 104 may be configured to identify the second operator based on the signal and/or the identifier associated therewith, such as via a Bluetooth connection with the second operator computing device 108. In various examples, the vehicle computing device 104 may determine that the second operator computing device 108 is within the threshold distance based on an identification thereof. In some examples, the vehicle computing device 104 may generate a geo-fence a distance around the vehicle 106. In such examples, the vehicle computing device 104 may be configured to determine that the second operator computing device 108 enters the geo-fenced area. Based on an entry into the geo-fenced area, the vehicle computing device 104 may determine that the second operator computing device 108 and/or the second operator 110 is within the threshold distance of the vehicle 106.

Based on a determination that the second operator 110 is within a threshold distance and is a scheduled operator, the vehicle computing device 104 may send an indication of operator proximity to the server computing device(s) 102. In various examples, the server computing device(s) 102 may be configured to determine that the second operator is proximate the vehicle 106 based on location data 120 received from the vehicle computing device 104 and location data received from the second operator computing device 108, such as via a location component. In such examples, the server computing device(s) 102 may compare location data 120 to the location data associated with the second operator computing device 108 to determine whether the second operator 110 (with the second operator computing device 108) is within a threshold distance of the vehicle 106.

In some examples, responsive to determining that the second operator computing device 108 is within the threshold distance of the vehicle 106, the server computing device(s) 102 may cause data to be output on the second operator computing device 108. The data may include data indicating an option to enable the second operator 110 to signal intent to unlock the vehicle. In some examples, the data may include an unlock user interface associated with the application(s) 122. In some examples, the server computing device(s) 102 may send an instruction to surface the user interface. As will be discussed in greater detail below with regard to FIG. 3, the user interface may include a selectable option to enable the second operator 110 to indicate an intent to access the vehicle 106 for operation. For example, the second operator 110 may select the selectable option to unlock the vehicle 106. Based on selection of the selectable option, the second operator computing device 108 may send a message to the server computing device(s) 102 requesting that the vehicle 106 be unlocked (e.g., indicating an intent to access the vehicle 106).

In various examples, based on receiving the unlock request, the server computing device(s) 102 may send an instruction to the vehicle computing device 104 to unlock the vehicle 106. In some examples, based on receiving the unlock request, the server computing device(s) 102 may first verify that the second operator 110 is scheduled to operate the vehicle 106 at a time substantially associated with the unlock request. In such examples, based on a verification that the second operator 110 is scheduled to operate the vehicle 106, the server computing device(s) 102 may send the instruction to unlock the vehicle 106. Responsive to receiving the instruction to unlock the vehicle 106, the vehicle computing device 104 may transmit a signal to unlock the vehicle. The signal may include an unlock code (e.g., coded signal, frequency, amplitude, etc.) that is specific to the vehicle. In at least one example, the signal may include a radio frequency signal including a code associated with the vehicle.

In some examples, the second operator 110 may access the unlocked vehicle 106 and begin a second delivery route. As discussed above, the server computing device(s) 102 may provide the second delivery route to the second operator computing device 108 and/or the vehicle computing device 104 for display to the second operator 110. In various examples, the server computing device(s) 102 may be configured to coordinate multiple operators 110 consecutively accessing a vehicle 106 to continuously deliver packages contained therein.

In various examples, during the continuous operation of the vehicle 106, the server computing device(s) 102 may monitor the vehicle conditions (e.g., an amount of fuel, battery charge remaining, tire pressure, vehicle diagnostics, etc.), such as via the conditions data 118 transmitted by the vehicle computing device 104. In such examples, the server computing device(s) 102 may be configured to determine when a delivery vehicle requires service or should be otherwise taken off-duty. In at least one example, the server computing device(s) 102 may be configured to determine when a fuel level and/or battery charge associated with the vehicle 106 drops below a threshold level. The fuel and/or battery charge information may be sent continuously while in operation, periodically (e.g., every 15 minutes, every hour, etc.), and/or at one or more predetermined fuel and/or battery charge levels (e.g., 50% full, 25% full, 10% full, based on an illumination of a low fuel light, etc.). In some examples, the threshold level may be a pre-determined amount (e.g., 3 gallons of gas remaining, 50 miles of travel remaining, 10% charge remaining, etc.). In some examples, the threshold level may be dynamically determined, such as based on a number of fueling stations in the environment and/or a proximity to the nearest fueling station. For example, a vehicle operating in a suburb with fueling stations located approximately every mile may have a threshold level of 2 gallons and a vehicle operating in rural area with fueling stations located approximately every 10 miles may have a threshold level of 5 gallons.

In various examples, based at least in part on a determination that the fuel level and/or battery charge level is below threshold level, the server computing device(s) 102 may identify one or more fueling stations proximate a delivery route (e.g., initial, updated, etc.) associated with the vehicle 106. As will be discussed in detail below with regard to FIG. 2, the server computing device 102 may generate an updated delivery route including a stop at a fueling station. In various examples, the server computing device may be configured to coordinate payment for the fuel and/or charge via the application(s) 122 on the operator computing device 108.

Figure 2:
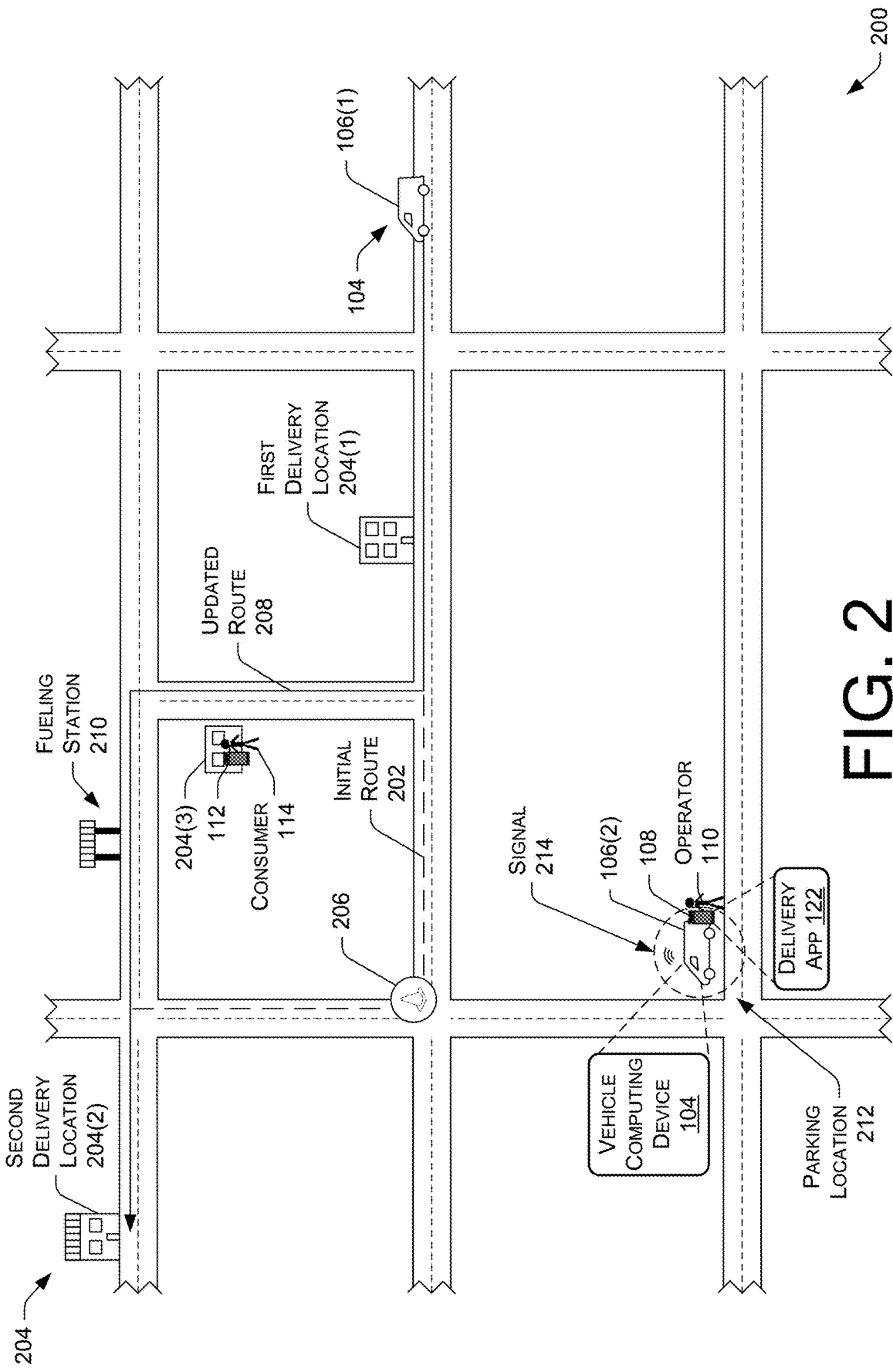
FIG. 2 illustrates an example environment in which a package delivery system may be utilized.

FIG. 2 illustrates an environment 200 in which a package delivery system as described herein may be utilized. A server computing device, such as server computing device(s) 102, may monitor a location associated with a vehicle 106, such as vehicle 106(1). The vehicle 106(1) may include packages for delivery by one or more operators 110. The packages may include items that were purchased by consumers 114 prior to vehicle loading and/or dispatch. In some examples, the packages may additionally include frequently purchased items. The frequently purchased items may include perishable and/or non-perishable goods that are purchased (for delivery) by consumers 114 in the environment 200 at or above a threshold rate. For example, the server computing device may determine that printer paper is a frequently purchased item for delivery in a business district. Although not associated with a scheduled delivery, the server computing device may cause printer paper to be packaged and loaded into the vehicle 106(1) prior to dispatch and the vehicle 106(1) may be prepared for an unscheduled delivery of printer paper.

In some examples, the server computing device may determine one or more groups of packages to be loaded into the vehicle 106(1) prior to dispatch. In some examples, the groups of packages may each be associated with an operator 110. In such examples, the server computing device may have a first group of packages scheduled for delivery by a first operator 110, a second group of packages scheduled for delivery by a second operator 110, and so on. In some examples, the server computing device may include a plurality of packages based on delivery locations associated therewith. In such examples, the packages loaded into the vehicle 106(1) may include those with delivery locations within a particular geographic area (e.g., a city, a suburb, 50 square miles, rural delivery, etc.).

In various examples, prior to dispatch, the server computing device may determine an initial route 202 for the vehicle 106(1) based on the first delivery location 204(1) and the second delivery location 204(2). In some examples, the initial route 202 may be based on one or more environmental conditions in the environment 200 prior to dispatch. The environmental condition(s) may include traffic, accidents, construction, or any other conditions that impact the delivery vehicle progress along the initial route 202. In some examples, the initial route 202 may include the fastest route between delivery locations 204.

In various examples, the server computing device may monitor a location of the vehicle 106(1) on the initial route 202 and the environmental condition(s). In some examples, the server computing device may be configured to identify a traffic delay 206. The traffic delay 206 may include a traffic accident, malfunctioning traffic light, and an unanticipated (e.g., unknown prior to dispatch) construction zone or other cause for a traffic build-up. Based on the traffic delay 206, the server computing device may determine an updated route 208 for delivery. In the illustrative example, the updated route 208 may include the first delivery location 204(1) and the second delivery location 204(2) approached in the same order. In other examples, the updated route 208 may include the delivery locations 204 being serviced in a different order. In some examples, the updated route 208 may omit delivery at a particular delivery location 204, such as based on proximity to the traffic delay. In such examples, the server computing device may include the particular delivery location 204 in a delivery route associated with another operator.

In some examples, the server computing device may determine that the traffic delay 206 may increase a time associated with the initial route 202 above a threshold time (e.g., more than 5 minutes, 10 minutes, etc.). In some examples, based on a determination that the traffic delay 206 increase the time above the threshold, the server computing device may determine the updated route 208.

In various examples, the server computing device may be configured to receive an order from a consumer 114 for an item to be delivered to a delivery location 204 associated therewith, such as delivery location 204(3). The order may be sent to the server computing device via an application and/or website associated with the server computing device on a consumer computing device 112. The server computing device may identify the item as a frequently purchased item. The server computing device may determine that the frequently purchased item is located in the vehicle 106(1) and that the updated route 208 may cause the vehicle 106(1) to operate in proximity to the delivery location 204(3). In various examples, the proximity between the delivery location 204(3) and initial route 202 and/or an updated route 208 may be based on the delivery vehicle 106(1) operating on a road associated with the delivery location (e.g., same road as address, an adjoining road, etc.). In some examples the proximity may be based on a distance away from the current route (e.g., initial route 202 or the updated route 208) and/or a time added to the current route. In such examples, the server computing device may determine to cause the vehicle 106(1) to stop at the delivery location 204(3) for an unscheduled (e.g., dynamic, spontaneous) delivery based on the distance and/or time being equal to or less than a threshold distance and/or time.

In various examples, the server computing device may monitor one or more conditions associated with the vehicle 106(1) while operating in the environment 200. The vehicle condition(s) may include an amount of fuel, battery charge remaining, tire pressure, vehicle diagnostics, or the like. In various examples, the vehicle computing device 108 may provide the vehicle condition(s) continuously, periodically (e.g., every 10 minutes, 15 minutes, etc.), and/or at random intervals to the server computing device. In some examples, the vehicle computing device 108 may send the vehicle condition(s) based on a determine that a condition associated therewith is met, such as a level of fuel drops below a threshold level, a battery charge drops below a threshold level, or the like.

In at least one example, the server computing device(s) may be configured to determine when a fuel level and/or battery charge associated with the vehicle 106(1) drops below a threshold level. In some examples, the threshold level may be a pre-determined amount (e.g., 3 gallons of gas remaining, 50 miles of travel remaining, 10% charge remaining, etc.). In some examples, the threshold level may be dynamically determined, such as based on a number of fueling stations 210 in the environment and/or a proximity to the nearest fueling station 210. For the purposes of this example, the fueling station 210 may include one or more pumps for fueling gasoline and/or one or more electric charging stations. In various examples, based on the fuel and/or battery level, the server computing device may update an updated route 204 to include a stop at the fueling station 210. In some examples, the fueling and/or charging station(s) may include station(s) configured to communicate with the vehicle computing device, operator computing device, and/or server computing device, such as to facilitate verification of the delivery vehicle and to coordinate payment.

In some examples, the server computing device may select a fueling station 210 and provide information associated therewith to the operator 110 corresponding to the vehicle 106(1). In such examples, the server computing device may select the fueling station 210 based on a proximity to the updated route 208 (e.g., current route), ease of entering/exiting the fueling station 210, a current wait time for a pump and/or charge, or the like. In some examples, the server computing device may provide information about one or more fueling stations to the operator 110 for selection of a particular fueling station 210.

In various examples, the server computing device may determine that the vehicle 106(1) is located within a threshold distance of a pump or plug associated with a fueling station 210 (e.g., 3 feet, 5 feet, 2 meters, etc.). The location may be based on location information provided by the GPS and/or another location component associated with the vehicle computing device 108 and/or a location component associated with an operator computing device 108. In some examples, based on a determination that the vehicle 106(1) and/or operator 110 is located at the pump or plug, the server computing device may cause a payment user interface associated with a payment function to surface on the operator computing device 108, such as via an application. In some examples, the operator 110 may access the payment user interface associated with the payment function on the operator computing device 108.

In various examples, the payment user interface may enable the operator 110 to pay for the fuel and/or charge associated with the vehicle 106(1). In such examples, the payment user interface may include a near field communication or other contactless payment transmission, or the like. In some examples, the vehicle computing system 104 may be configured to periodically or continuously send an indication of the fuel and/or charge level of the vehicle during fueling and/or charging operations. In such examples, the server computing device may be configured to verify fueling and/or charging of the delivery vehicle. In some examples, the server computing device may pre-authorize an initial amount of fuel and/or charge (e.g., 1 gallon, 100 Watts, $5.00, etc.) for the vehicle 106(1). In such examples, based on a verification that the delivery vehicle is being fueled, the server computing device may authorize a full amount for the fuel and/or charge.

In various examples, the fueling station 210 may be configured to identify the delivery vehicle at the pump or plug, such as via the Bluetooth signal transmitted by the vehicle computing device and vehicle identifier associated therewith. In such examples, the fueling station 210 may determine a cost for the fuel and/or charge associated with the vehicle 106(1) and send a request for payment to the server computing device. The server computing device may be configured to coordinate payment for the fuel and/or charge.

In various examples, the vehicle computing device may send a message to the server computing device indicating that the fueling and/or charging is complete (e.g., delivery vehicle has been fully fueled and/or charged). In some examples, the server computing device may determine that fueling and/or charging is complete based on a determination that a location associated with the delivery vehicle has changed. In some examples, based on an indication that the fueling and/or charging is complete, the server computing device may update the current route, such as based on current conditions in the environment, and send an updated route 208 to the vehicle computing device 104 and/or operator computing device 108. The operator 110 may continue along the delivery route until the delivery route and/or work shift associated therewith is complete.

In various examples, based on a determination that a delivery route and or work shift associated with an operator 110 is complete, the server computing device may provide the vehicle computing device 104 and/or the operator computing device 108 with a parking location 212. As illustrated in FIG. 2, the vehicle 106(2) may be located at the parking location 212, such as between delivery routes associated therewith. In some examples, the parking location 212 may include space to accommodate one or more vehicles 106(1), 106(2), etc.

In various examples, the server computing device may provide an address, a latitude and longitude, or other identifying information associated with the parking location 212. In various examples, the server computing device may provide an updated route 208 including the parking location 212. In such examples, the parking location 212 may include a last stop associated with the updated route 208. In various examples, the server computing device(s) may send the parking location 212 (e.g., address, latitude/longitude, etc.) to a subsequent operator 110 of the vehicle, such as via an instance of a delivery application on an operator computing device 108. In such examples, the subsequent operator 110 ("second operator") may arrive at the parking location 212 in order to begin a work shift associated therewith. The server computing device(s) 102 may additionally provide the second operator 110 with an identifier associated with the vehicle 106 and/or details associated with a delivery route associated with the second operator 110, such as an initial route 202. The details may include hours associated with a work shift, a number of scheduled deliveries, initial route 202 information, or the like. Additionally or alternatively, the server computing device may provide the vehicle computing device 104 with data associated with the second operator, such as an employee identification number, operator computing device name and/or identification number, an operator name, a scheduled work shift start time, or the like.

In various examples, the vehicle computing device 104 may be configured to determine that a second operator computing device 108 associated with the second operator 110 is within a threshold distance of the vehicle 106(2). In some examples, the vehicle computing device 104 may be configured to transmit a signal 214, such as a Bluetooth signal or other signal including an identifier associated with the vehicle 106(2). In various examples, the vehicle computing device 104 may be configured to receive signals, such as Bluetooth signals, from one or more other computing devices. The vehicle computing device 104 may be configured to identify the second operator 110 based on the signal 214 and/or the identifier associated with the second operator 110, such as via a Bluetooth connection with the second operator computing device 108. In various examples, the vehicle computing device 104 may determine that the second operator computing device 108 is within the threshold distance based on an identification thereof. In some examples, the vehicle computing device 104 may generate a geo-fence a distance around the vehicle 106(2). In such examples, the vehicle computing device 104 may be configured to determine that the second operator computing device 108 enters the geo-fenced area. Based on an entry into the geo-fenced area, the vehicle computing device may determine that the second operator computing device 108 and/or the second operator 110 is within the threshold distance of the vehicle 106(2). Based on a determination that the second operator 110 is within a threshold distance of the vehicle 106(2) and/or is scheduled to operate the vehicle 106(2), the vehicle computing device 104 may send an indication of operator proximity to the server computing device.

In various examples, the server computing device may be configured to determine that the second operator 110 is proximate the vehicle 106(2) based on location data received from the vehicle computing device 104 and location data received from the second operator computing device 108, such as via a location component. In such examples, the server computing device may compare location data associated with the vehicle 106(2) to the location data associated with the second operator computing device 108 to determine whether the second operator is within a threshold distance of the vehicle 106. Based on a determination that the second operator computing device 108 is within a threshold distance of the vehicle 106(2) at the parking location 212, the server computing device may determine that the second operator 110 is in proximity to the vehicle 106(2).

In some examples, responsive to determining that the second operator 110 is within the threshold distance of the vehicle 106(2), the server computing device may cause an unlock user interface to surface on a display of the second operator computing device 108, such as via the delivery application. In some examples, the server computing device may send an instruction to surface the user interface, such as in a push notification. As will be discussed in greater detail below with regard to FIG. 3, the user interface may include a selectable option to enable the second operator 110 to cause the vehicle 106(2) to unlock.

In various examples, based on receiving an indication of selection of the selectable option to unlock the vehicle 106(2) (e.g., the unlock request), the server computing device may send an instruction to the vehicle computing device 104 to unlock the vehicle 106. In some examples, based on receiving the unlock request, the server computing device may first verify that the second operator 110 is scheduled to operate the vehicle 106(2) at a time substantially associated with the unlock request (e.g., work shift scheduled to begin within a threshold time of the unlock request). In such examples, based on a verification that the second operator 110 is scheduled to operate the vehicle 106(2), the server computing device may send the instruction to unlock the vehicle 106. Responsive to receiving the instruction to unlock the vehicle 106, the vehicle computing device 104 may transmit a signal to unlock the vehicle. The signal may include an unlock code (e.g., coded signal, frequency, amplitude, etc.) that is specific to the vehicle 106(2). In at least one example, the signal may include a radio frequency signal including a code associated with the vehicle 106(2).

In some examples, the second operator 110 may access the unlocked vehicle 106(2) and begin a second delivery route to deliver packages located therein. In such examples, the package delivery system may enable continuous delivery of packages via vehicle 106(1), 106(2), etc., thereby maximizing efficiency in the delivery system.

Figure 3:
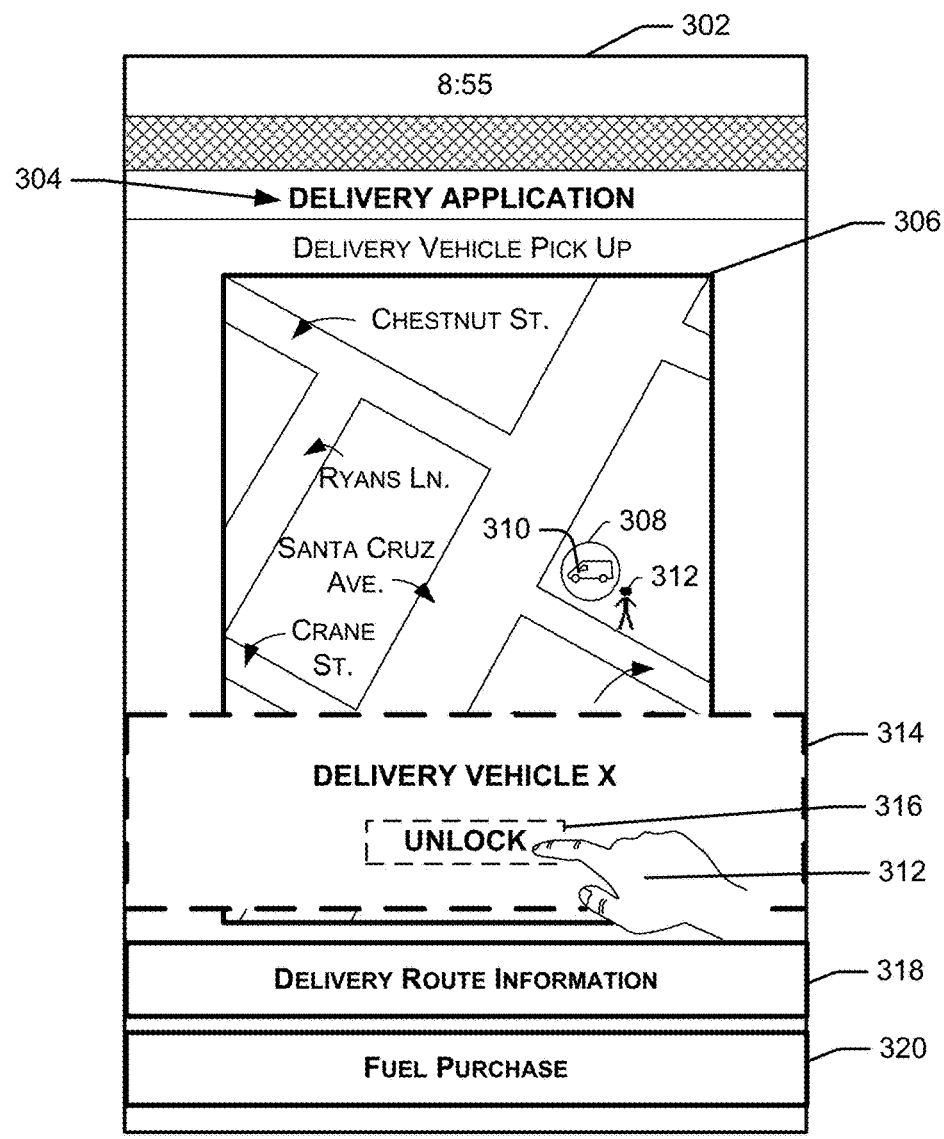
FIG. 3 illustrates an example operator computing device displaying a user interface of a delivery application associated with the package delivery system described herein.

FIG. 3 illustrates an example operator computing device 300 displaying a user interface 302 of a delivery application 304 associated with the package delivery system described herein. In various examples, the delivery application 304 may be configured to display a map 306 to assist the operator in navigating to various locations (e.g., delivery locations, parking location, etc.) in the environment. In the illustrative example, the map 306 is associated with a delivery vehicle pick up functionality of the delivery application 304.

As illustrated in FIG. 3, the map 306 may include roads, an indication of a location associated with the vehicle 310 location, and an indication of a location associated with the operator 312. In other examples, such as those associated with delivery route functionality, the map 306 may include one or more delivery locations, fueling stations, storage facilities for loading additional packages, or the like.

In the illustrated example, the location associated with the vehicle 310 includes a parking location 308. The parking location 308, such as parking location 212, may be include a location in which a vehicle 310, such as vehicle 106, is parked between operators 312. For example, a server computing device may send an instruction for a first operator to park and lock the vehicle 310 at the parking location 308. The server computing device may send a second instruction to a second operator to travel to the parking location 308 to pick up the vehicle 310 and begin a work shift associated therewith.

In various examples, the server computing device may determine that the operator 312 is in proximity to (within a threshold distance of) the vehicle 310 and/or the parking location 308. Based on a determination that the operator 312 is in proximity to the vehicle 310 and/or the parking location 308, the server computing device may cause the unlock notification 314 to surface on the user interface 302. The notification 314 may include a selectable option 316 enabling the operator 312 to cause the vehicle to be unlocked. As described above, the server computing device may receive an indication of selection of the selectable option and may send an instruction to the vehicle computing device to transmit a signal to unlock the vehicle.

Although illustrated as a user interface 302, other types of data output with regard to the unlock functionality may be contemplated. For example, the delivery application 304 may cause an audible sound to be emitted from a speaker of the operator computing device 300 responsive to the operator computing device 300 coming within a threshold distance of the vehicle 310. The operator 312 may respond to the audible sound by issuing a verbal command to unlock the vehicle 310 into a microphone of the operator computing device 300. The delivery application 304 may receive the audible command and send the indication of intent to unlock the vehicle 310 to the vehicle computing device via the server computing device.

As illustrated, the delivery application 304 may include additional functionality, such as delivery route information 318 and fuel purchase 320. The delivery route information 318 may include a selectable option enabling the operator 312 to access information about a delivery route associated therewith. The fuel purchase 320 may include a selectable option enabling the operator 312 to coordinate the purchase of fuel for the vehicle 310.

FIGS. 4-10 illustrate various processes related to package delivery and associated actions utilizing the optimized delivery system. The processes described herein are illustrated as collections of blocks in logical flow diagrams, which represent a sequence of operations. In some examples, some or all of the operations may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, and user interfaces described in the examples herein, such as, for example those described with respect to FIGS. 1-3, although the processes may be implemented in a wide variety of other environments, architectures, user interfaces, and systems.

FIG. 4 illustrates a process 400 for unlocking a vehicle. Some or all of the steps of the process 400 may be performed by the server computing device illustrated in FIG. 11.

At block 402, the process includes generating a first delivery route for delivery a first set of packages associated with a first operator via a vehicle, the vehicle including the first set of packages and a second set of packages associated with a second operator. A delivery route, such as the first delivery route, may include a stop associated with each package of the first set of packages (e.g., 10 packages, 15 packages, etc.). A number of packages included in a set of packages may be based on distances between delivery locations associated therewith, a work shift associated with the operator, and/or other factors. The first delivery route may be determined based on the delivery locations associated with each package of the first set of packages and one or more first environmental conditions that may impact an efficiency of operation. The first environmental condition(s) may include a time of day, day of the week, traffic conditions prior to beginning the delivery route, construction zones, road blocks, active school zones, and/or other conditions in environment prior to dispatch. In at least one example, the delivery route may include a most efficient route for delivery based on the first environmental condition(s).

At block 404, the process includes sending the first delivery route to at least one of a vehicle computing device associated with the vehicle or a first operator computing device associated with the first operator. In some examples, based upon receipt of the first delivery route, the at least one of the vehicle computing device or the first operator computing device may cause the first delivery route to be displayed on a display associated with the delivery vehicle, such as a navigation display or a display associated with the first operator computing device. In examples in which the vehicle is an autonomous vehicle, the vehicle computing device may receive the first delivery route and may cause one or more drive systems and/or computing devices associated with the vehicle to operate the vehicle along the delivery route.

At block 406, the process includes determining that a first delivery route is complete. In some examples, a determination of route completion may be based on receiving an indication that the first operator has delivered a last package (e.g., a final package remaining) of the first set of packages. In such examples, the server computing device(s) may receive the indication from the first operator computing device, such as based on a scan of a label associated with the last package at a delivery location associated therewith. In some examples, the server computing device(s) may determine route completion based on a determine that the work shift of the first operator is complete, or a current time is within a threshold time of completion. In some examples, the threshold time may be pre-determined amount of time. In some examples, the threshold time may be dynamically determined, such as based on a time required to deliver a next package.

At block 408, the process includes determining a parking location for the vehicle. The parking location may include a location where the vehicle may be parked, locked, and left by the first operator. In some examples, the parking location may include a dynamically determined parking area, such as based on parking location that are available. In some examples, the parking location may include a general area, such as a city block, and the first operator may locate an available parking spot in the city block. In various examples, the parking location may include a pre-determined parking area, such as a reserved parking lot or spot therein, reserved street parking, or the like. In some examples, the parking location may be proximate (e.g., within a threshold distance of (e.g., within 5 blocks, 30 feet, 20 meters, etc.)) to the first delivery route or a second delivery route. In such examples, the transition from the first delivery route to the parking location and from the parking location to the second delivery route may include a limited time.

At block 410, the process includes sending the parking location to a second operator computing device associated with the second operator and the at least one of the vehicle computing device or the first operator computing device. In examples in which the vehicle is autonomous, the vehicle computing device may cause one or more drive systems and/or computing systems of the vehicle to operate the vehicle to the parking location. In various examples, the first operator may navigate the vehicle to the parking location. In some examples, the vehicle computing device and/or the first operator (via the first operator computing device) may provide an indication to the server computing device that the vehicle is at the parking location. In some examples, the server computing device may determine that the vehicle is at the parking location based on receiving a location associated with the vehicle computing device, such as from a location component associated therewith. In some examples, the first operator, via the first operator computing device, may send a message to the server computing device indicating shift completion and vehicle security (e.g., at parking location, locked, alarm armed, etc.)

As illustrated above in FIG. 3, the server computing device may cause an application to display a map with the parking location and/or a current location associated with the second operator (e.g., ownship). The second operator may travel (e.g., navigate) to the delivery vehicle at the parking location to begin a work shift delivering the second set of packages. In examples in which the parking location is dynamically determined, such as by the first operator identifying an available parking spot at the parking location, the server computing device may update the parking location provided to the second operator.

At block 412, the process includes sending a second delivery route for delivering the second set of packages associated with the second operator to at least one of the vehicle computing device or the second operator computing device. The second delivery route may be determined based on the delivery locations associated with each package of the second set of packages and one or more second environmental conditions that may impact an efficiency of operation. The second environmental condition(s) may include the existing conditions prior to generating the second delivery route (e.g., within a threshold time of the second operator beginning the second delivery route). The second operator may receive the second delivery route and deliver the packages of the second set of packages at the respective locations.

Figure 5:
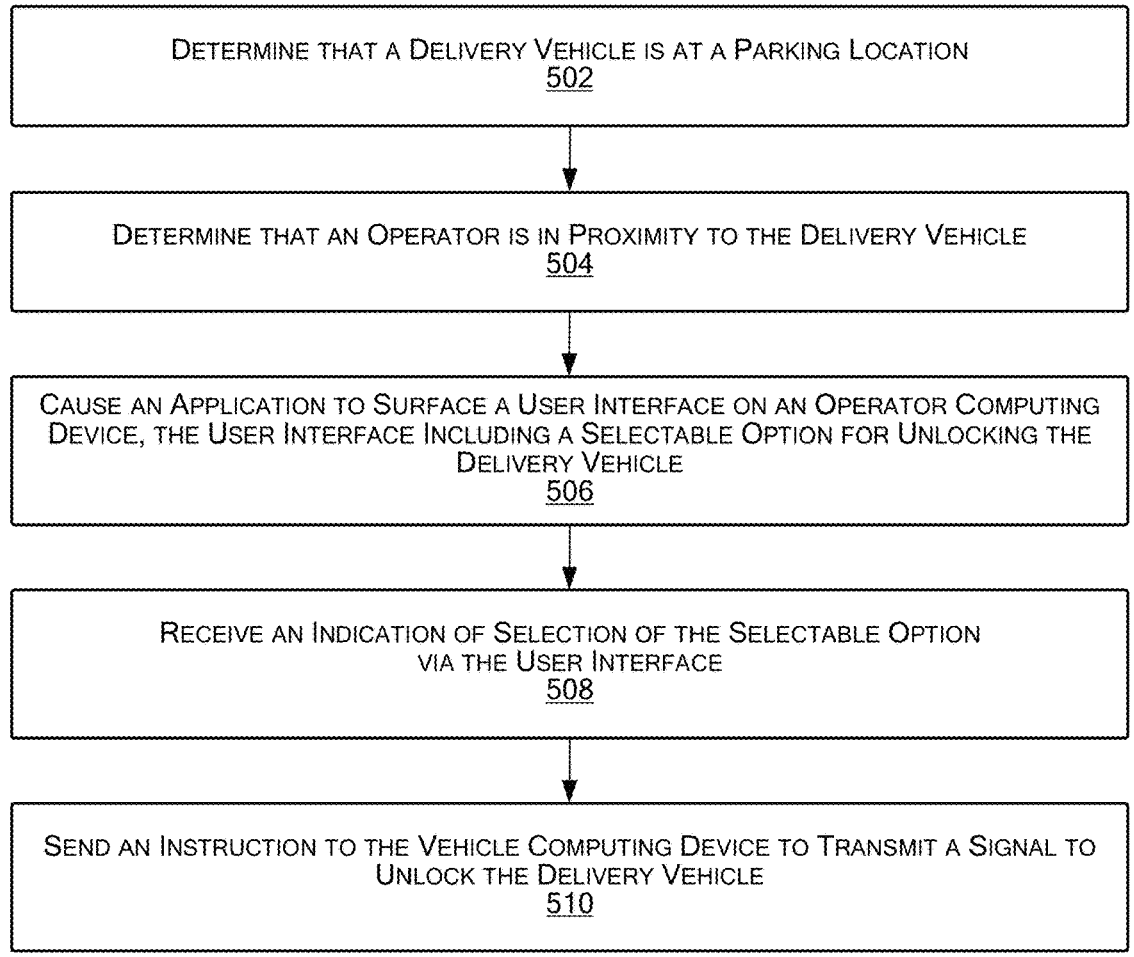
FIG. 5 illustrates a flow diagram of an example process for unlocking a vehicle for use by a second operator.

FIG. 5 illustrates a process 500 for unlocking a vehicle. Some or all of the steps of the process 500 may be performed by the server computing device illustrated in FIG. 11.

At block 502, the process includes determining that the delivery vehicle is at the parking location. In various examples, the server computing device may receive a location of the vehicle, such as from a location component of the vehicle computing device, and may determine that the location of the vehicle corresponds to the parking location. In some examples, the server computing device may receive a message from an operator computing device associated with an operator that operated the vehicle to the parking location. In such examples, the message may include a location associated with the operator computing device, an indication of shift completion, an indication of vehicle security (e.g., vehicle locked, alarm armed, etc.), or the like.

At block 504, the process includes receiving an indication that an operator (e.g., subsequent to the operator that operated the vehicle to the parking location) is within a threshold distance of a vehicle computing device associated with a delivery vehicle. In various examples, the indication may be sent to a server computing device from a vehicle computing device. In some examples, the vehicle computing device may transmit a signal including the identifier associated with the vehicle and/or vehicle computing device. The signal may include a Bluetooth signal or other wireless signal capable of transmitting the identifier. In some examples, based on receipt of a signal from the operator computing device, such as a short-range signal, the vehicle computing device may determine that the operator is within the threshold distance.

In various examples, the vehicle computing device may be configured to identify an operator based on receipt of a Bluetooth or other signal transmitted by an operator computing device. In some examples, the vehicle computing device may identify the operator based on an identifier associated therewith. In such examples, the identifier may be embedded in a signal received by the vehicle computing device from the operator computing device. In various examples, the indication that the operator is within the threshold distance may include the identifier associated with the operator.

In various examples, the proximity of the operator to the vehicle may be determined by the server computing device based on a location associated with the operator computing device and a location associated with the vehicle. In such examples, server computing device may determine that a location associated with the operator, such as that received from a location component of the operator computing device, is within a threshold distance of a location associated with the vehicle (e.g., parking location, GPS location of the vehicle computing device, etc.).

At block 506, the process includes causing an application to surface a user interface on an operator computing device, the user interface including a selectable option for unlocking the delivery vehicle. In various examples, the server computing device may send a notification to the application, such as in a push notification, to surface the selectable option. In some examples, the server computing device may send an instruction to the application to launch the application and surface the user interface and/or the selectable option.

At block 508, the process includes receiving an indication of selection of the selectable option via the user interface. The server computing device may receive the indication from the application responsive to the operator selecting the selectable option to unlock the delivery vehicle.

At block 510, the process includes sending an instruction to the vehicle computing device to transmit a signal to unlock the delivery vehicle. The signal may include a code, frequency and/or amplitude specific to the vehicle and configured to cause the vehicle to unlock. In some examples, the signal may include a radio frequency signal transmitted by the vehicle computing device. In some examples, the signal may be sent to an internal computer associated with the vehicle via an OBD port or other port via which the vehicle computing device is coupled to the vehicle. Responsive to receiving the instruction, the vehicle computing device may transmit the signal to unlock the vehicle.

FIG. 6 illustrates a process 600 for generating an updated delivery route based at least in part on an identified traffic delay. Some or all of the steps of the process 600 may be performed by the server computing device illustrated in FIG. 11.

At block 602, the process includes generating a delivery route for a delivery vehicle based at least in part on delivery locations associated with packages scheduled for delivery and a condition in the environment at a first time. The environmental condition may include traffic, accidents, construction, or any other conditions present in the environment at the first time that may impact progress of the delivery vehicle progress through the environment.

The packages scheduled for delivery may include packages ordered prior to vehicle loading (e.g., prior to a first time, at a second time before the first time). The packages scheduled for delivery may include packages scheduled to be delivered by a first operator. In some examples, the vehicle may additionally include packages scheduled to be delivered by a second operator, a third operator, or the like. In some examples, the vehicle may include packages containing frequently purchased items. In such examples, the vehicle may be configured to conduct dynamic delivery (e.g., spontaneous delivery) of the frequently purchased items.

At block 604, the process includes sending the delivery route to at least one of an operator computing device or a vehicle computing device associated with the delivery vehicle. In some examples, based upon receipt of the delivery route, the at least one of the vehicle computing device or the operator computing device may cause the delivery route to be displayed on a display associated with the delivery vehicle, such as a navigation display or a display associated with the operator computing device. In examples in which the vehicle is an autonomous vehicle, the vehicle computing device may receive the delivery route and may cause one or more drive systems and/or computing devices associated with the delivery vehicle to operate the delivery vehicle along the delivery route.

At block 606, the process includes identifying a traffic delay proximate the delivery route at a second time. A traffic delay may be based on traffic build-up, an unanticipated (e.g., unknown prior to dispatch) construction zone, or other obstruction along the delivery route that may slow the operation of the delivery vehicle along the delivery route.

At block 608, the process includes generating an updated delivery route based at least in part on the traffic delay. In some examples, the updated route may include a change to an order in which the packages of the group of packages are delivered. For example, an initial delivery route may include a first package being delivered first and a second package being delivered second and an updated delivery route may include the second package being delivered first and the first package being delivered second. In some examples, the updated route may include one or more different roads on which the delivery vehicle may operate to deliver the packages.

At block 610, the process includes sending the updated delivery route to the at least one of the operator computing device or the vehicle computing device. In some examples, the updated delivery route may be presented on a display associated with a vehicle display and/or a display associated with the operator computing device. In various examples, the server computing device may send a notification, such as a push notification to the operator computing device to alert the operator of the updated route.

Figure 7:
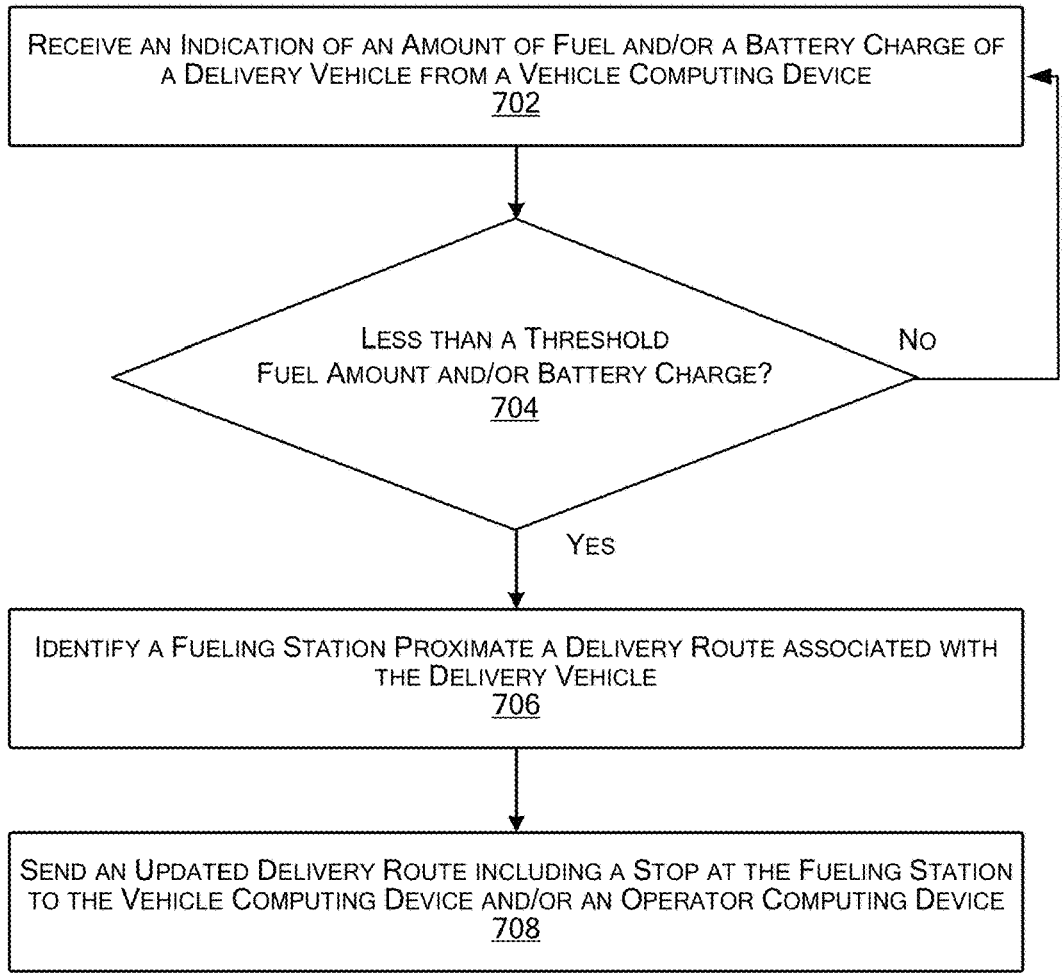
FIG. 7 illustrates a flow diagram of an example process for generating an updated delivery route to include a fueling and/or charging event.

FIG. 7 illustrates a process 700 for generating an updated delivery route based at least in part on a fuel level and/or battery charge. Some or all of the steps of the process 700 may be performed by the server computing device illustrated in FIG. 11.

At block 702, the process includes receiving an indication of an amount of fuel and/or battery charge of a vehicle from a vehicle computing device. In various examples, the vehicle computing device may send the indication of the amount of fuel and/or battery charge to the server computing device continuously, periodically (e.g., every 5 minutes, every 10 minutes, etc.), and/or randomly. In some examples, the vehicle computing device may be programmed to send the indication to the server computing device at pre-determined amounts of fuel and/or battery charge (e.g., 50% tank/charge remaining, 5 gallons remaining, 200 watts remaining, 10% tank/charge remaining, etc.).

At block 704, the process includes determining whether the amount of fuel and/or battery charge is less than a threshold fuel amount and/or battery charge. In various examples, the threshold amount may be a pre-determined amount of fuel and/or battery charge (e.g., 25% tank remaining, 4 gallons remaining, 150 watts remaining, 60 miles to drive, etc.). In various examples, the threshold amount may be dynamically determined based on the operating environment of the delivery vehicle. In such examples, the threshold amount may be based on a distance between fueling stations, proximity to a fueling station configured for fueling/charging the delivery vehicle (e.g., accepting payment from an operator computing device), proximity between delivery locations, or the like.

Responsive to a determination that the level of fuel or battery charge is not less than the threshold fuel level ("No" at block 704), the process includes receiving another indication of the level of fuel or the battery charge of the vehicle from the vehicle computing device. The server computing device may continually, periodically, and/or randomly receive indications of the level of fuel and/or the battery charge of the vehicle from the vehicle computing device.

Responsive to a determination that the level of fuel or battery charge is less than the threshold fuel level ("Yes" at block 704), at block 706 the process includes identifying a fueling station proximate a delivery route associated with the delivery vehicle. In various examples, the fueling station may include a station configured for fueling/charging the delivery vehicle and/or conducting a transaction for fuel with the operator and/or server computing device. In some examples, the identified fueling station may include a fueling station within a threshold distance of the delivery route (e.g., 10 blocks, 2 blocks, one mile, 1 kilometer, 3 minutes, etc.).

In some examples, the server computing device may determine that the fueling station is within a threshold distance from a modified delivery route. In some examples, the modified delivery route may include a route between a same first location and second location, but traveling along one or more different roads. In such examples, the modified delivery route may increase a time and/or distance associated with the delivery route by less than a threshold amount (e.g., less than 2 minutes, less than 4 minutes, less than 0.5 miles, etc.).

At block 708, the process includes sending an updated delivery route including a stop at the fueling station to the vehicle computing device and/or an operator computing device. The updated delivery route may include one or more same and/or different roads as the preceding delivery route. In some examples, the server computing device may send the updated delivery route to the operator computing device. In such examples, the operator computing device may be configured to automatically present the updated delivery route on a display of the operator computing device and/or a navigation display of the vehicle. In some examples, the server computing device may send the updated delivery route to the vehicle computing device. In some examples, the vehicle computing device may cause the updated delivery route to display on the navigation display of the vehicle. In examples in which the delivery vehicle is an autonomous vehicle, the vehicle computing device may cause one or more drive systems and/or computing devices associated with a vehicle drive system to operate the vehicle along the updated route and stop at the fueling station.

Figure 8:
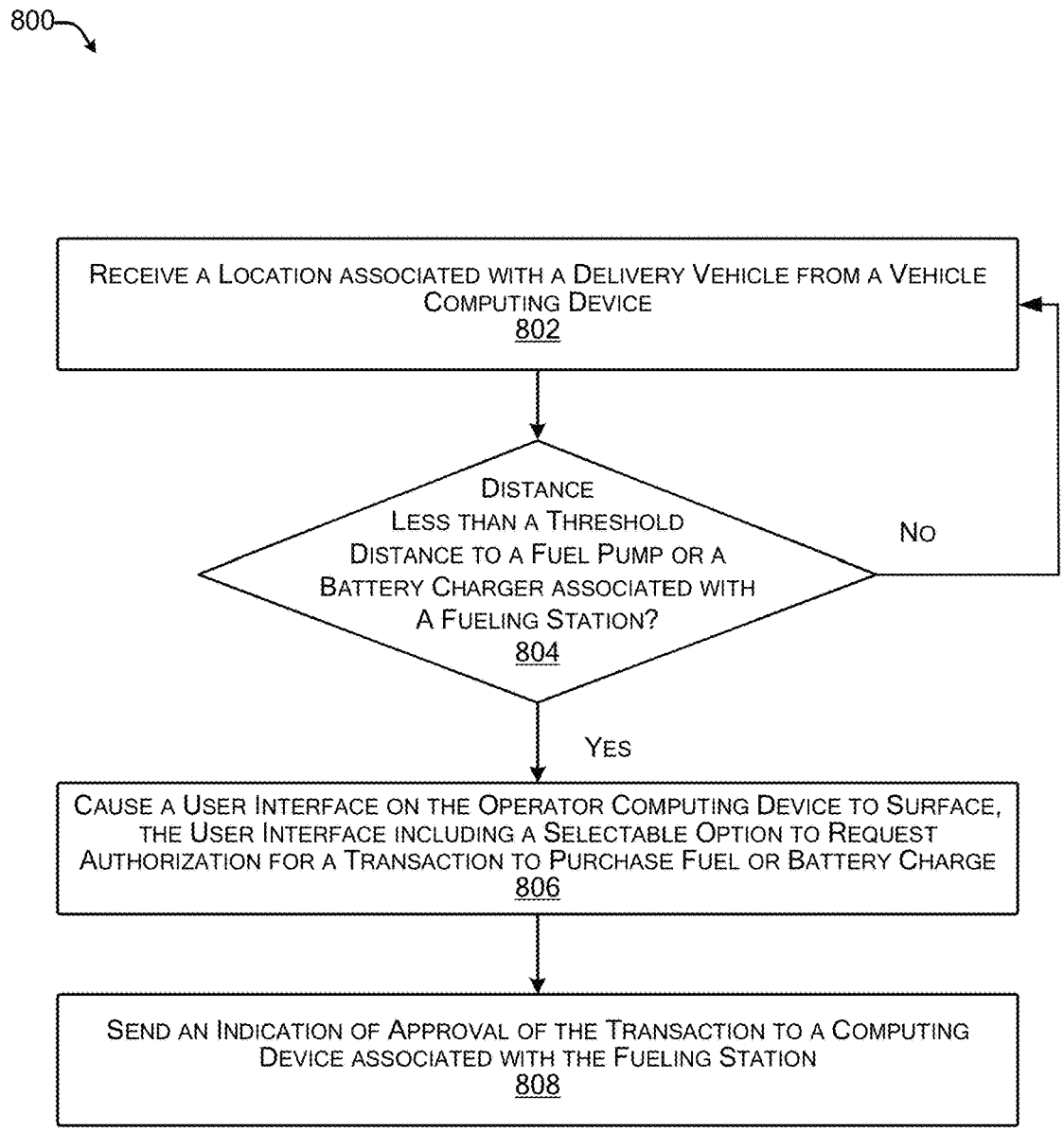
FIG. 8 illustrates a flow diagram of an example process for coordinating payment for a fuel transaction based on a proximity of a vehicle to a pump.

FIG. 8 illustrates a process 800 for facilitating the purchase of fuel for a delivery vehicle. Some or all of the steps of the process 800 may be performed by the server computing device illustrated in FIG. 11.

At block 802, the process includes receiving a location associated with a delivery vehicle from a vehicle computing device. In various examples, the vehicle computing device may send the location associated with the delivery vehicle to the server computing device continuously, periodically (e.g., every 5 minutes, every 10 minutes, etc.), and/or randomly. In some examples, the vehicle computing device may be programmed to send the location to the server computing device at pre-determined locations and/or associated with predetermined maneuvers (e.g., at a delivery location, a parking location, a fueling station, after conducting a U-turn, right turn, left turn, etc.).

At block 804, the process includes determining whether a distance between the location associated with the delivery vehicle and a location associated with a fuel pump or a battery charger associated with a fueling station is less than a threshold distance (e.g., 3 feet, 1 meter, etc.). In some examples, the threshold distance may be associated with a distance a fuel pump handle or battery charger may extend to reach a fueling or charging port of the delivery vehicle.

In various examples, the server computing device may have stored thereon a location associated with each fuel pump and/or battery charger associated with the fueling station. In such examples, the server computing device may compare the location associated with the vehicle and the location associated with the fuel pump or battery charger to determine whether the distance is less than a threshold. In various examples, the fueling station may be configured to communicate location data with the server computing device. In some examples, the fueling station may include a computing system configured to detect the delivery vehicle and/or send an indication to the server computing device that the delivery vehicle is located at a fuel pump and/or battery charger associated with the fueling station. In such examples, the server computing device may determine whether the delivery vehicle is less than a threshold distance from the fuel pump or battery charger based on the indication.

Responsive to a determination that the distance is not less than the threshold distance ("No" at block 804), the process includes receiving another location associated with the delivery vehicle. The server computing device may continually, periodically, and/or randomly receive locations associated with the vehicle from the vehicle computing device.

Responsive to a determination that the distance is less than a threshold distance to the fuel pump or battery charger ("Yes" at block 804), at block 806, the process includes causing a user interface on an operator computing device to surface, the user interface including a selectable option to request authorization for a transaction to purchase fuel or battery charge. The user interface may include a payment application, and/or a payment function associated with a delivery application. In some examples, the user interface may include a near field communication payment user interface. In such examples, based on a proximity to the computing device associated with the fueling station, the operator may be able to coordinate payment for the fuel and/or charge via the user interface.

Figure 9:
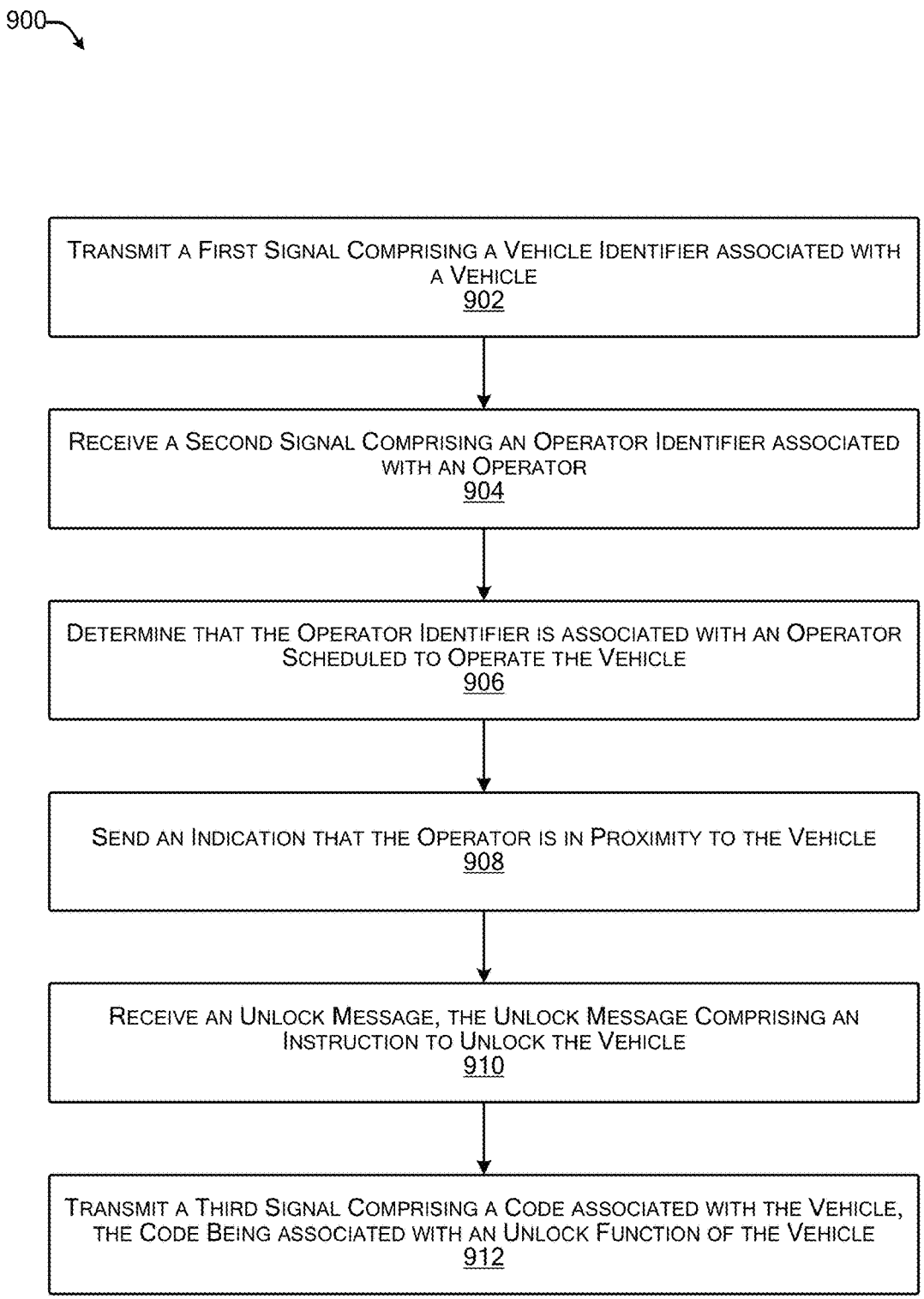
FIG. 9 illustrates a flow diagram of an example process for a vehicle computing device causing a vehicle to be unlocked.

At block 808, the process includes sending an indication of approval of the transaction to a computing device associated with the fueling station. The indication of approval may include an indication that the operator input a selection of a selectable option associated with the purchase of fuel and/or battery charge. In some examples, the indication may include a verification of the quantity and/or amount of fuel and input a selection FIG. 9 illustrates a process 900 for unlocking a vehicle via a vehicle computing device. Some or all of the steps of the process 900 may be performed by the vehicle computing device illustrated in FIG. 13.

At block 902, the process includes transmitting a first signal comprising a vehicle identifier associated with a vehicle. In various examples, the first signal may include a short-range communication signal. In at least one example, the first signal may include a Bluetooth signal transmitting the vehicle identifier.

At block 904, the process includes receiving a second signal comprising an operator identifier associated with an operator. The operator identifier may include an identification number associated with the operator and/or operator computing device, a name of the operator, or the like. In some examples, the second signal may be received from an operator computing device associated with the operator. In some examples, the second signal may include a short-range communication signal. In at least one example, the second signal may include a Bluetooth signal transmitting the operator identifier.

At block 906, the process includes determining that the operator identifier is associated with an operator scheduled to operate the vehicle. In various examples, the vehicle computing device may receive information associated with one or more scheduled operators from the server computing device. In such examples, the vehicle computing device may determine an identifier associated with an operator scheduled to operate the vehicle at a particular time, such as at a time associated with receiving the second signal.

In various examples, the vehicle computing device may receive the second signal comprising the identifier and may send the identifier to the server computing device for authorization to access the vehicle. In such examples, the server computing device may verify that the operator identifier corresponds to an operator scheduled to operate the delivery vehicle and may send a confirmation to the vehicle computing device.

At block 908, the process includes sending an indication that the operator is in proximity to the vehicle. In some examples, based on receiving the second signal, the vehicle computing device may send a message to the server computing device indicating that the operator is within a threshold distance (e.g., detectable distance of the short-range signal). In various examples, the indication that the operator is in proximity may include the operator identifier. In some examples, responsive to receiving the indication that the operator is in proximity, the server computing device may verify that the operator is scheduled to operate the delivery vehicle.

At block 910, the process includes receiving an unlock message, the unlock message comprising an instruction to unlock the vehicle. In some examples, the unlock message may be sent to the vehicle computing device from the server computing device based at least in part on a verification that the operator associated with the operator identifier is authorized (e.g., scheduled) to operate the vehicle.

At block 912, the process includes transmitting a third signal comprising a code associated with the vehicle, the code being associated with an unlock function of the vehicle. In various examples, the third signal may include a radio frequency signal configured to unlock the vehicle. In some examples, the third signal may be transmitted via an onboard diagnostics port to an internal computing system of the vehicle.

Figure 10:
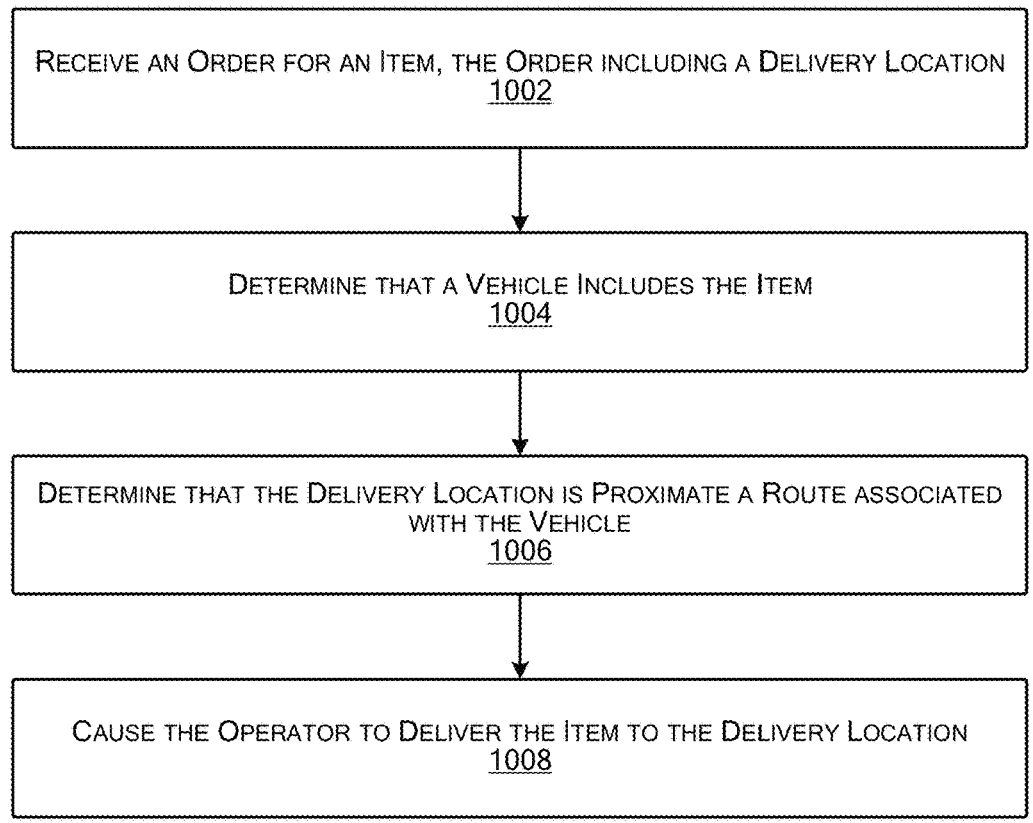
FIG. 10 illustrates a flow diagram of an example process for dynamically delivering an unscheduled item.

FIG. 10 illustrates a process 1000 for dynamically delivering an unscheduled item. Some or all of the steps of the process 1000 may be performed by the vehicle computing device illustrated in FIG. 11.

At block 1002, the process includes receiving an order for an item, the order including a delivery location. The item may include an item that is frequently purchased (e.g., frequently purchased item) in the operating environment. A frequently purchased item may include an item that is purchased by a threshold number of people in the operating environment per day (e.g., purchased at a threshold rate). The operating environment may include the area in which the delivery vehicle operates (e.g., city, suburbs, 60 square miles, etc.). In some examples, the frequently purchased items may include perishable goods. In such examples, the frequently purchased items may be stored in a refrigeration or other compartment of the delivery vehicle to prevent the goods from going stale and/or perishing. In some examples, the frequently purchased items may include non-perishable goods. In some examples, the frequently purchased items may be carried in the vehicle to enable a spontaneous delivery (e.g., not scheduled prior to vehicle dispatch).

At block 1004, the process includes determining that a vehicle includes the item. In various examples, the server computing device may cause packages associated with operators to be loaded in the delivery vehicle prior to dispatch. Additionally, the server computing device may identify on or more items that are frequently purchased in the environment and may cause the frequently purchased items to be included in packages carried by the delivery vehicle. Based on receipt of the order, the server computing device may identify one or more delivery vehicles including the frequently purchased item.

At block 1006, the process includes determining that the delivery location is proximate a route associated with the vehicle. In some examples, the proximity to the route may include a threshold distance. In such examples, the server computing device may determine that the delivery location is less than a threshold distance (e.g., 2 blocks, 3 minutes, etc.) from the route associated with the vehicle.

At block 1008, the process includes causing the operator to deliver the item to the delivery location. In various examples, the server computing device may send an instruction to the operator computing device to perform the dynamic delivery and deliver the frequently purchased item. In some examples, the instruction may include a push notification sent via a delivery application on the operator computing device. In various examples, the instruction may include the delivery location, a name associated with the order, a location of the package containing the item in the vehicle, and/or any additional information the operator may need to identify and deliver the package containing the item.

In some examples, the server computing device may send an updated route to the vehicle computing device and/or the operator computing device including a stop at the delivery location. In examples in which the delivery vehicle is autonomous, the vehicle computing device may cause one or more drive systems to operate the vehicle along the updated route to stop at the delivery location. In some examples, the operator may operate the vehicle along the updated delivery route, such as that presented on a navigation display or a display of the operator computing device to facilitate navigation, to the delivery location.

Figure 11:
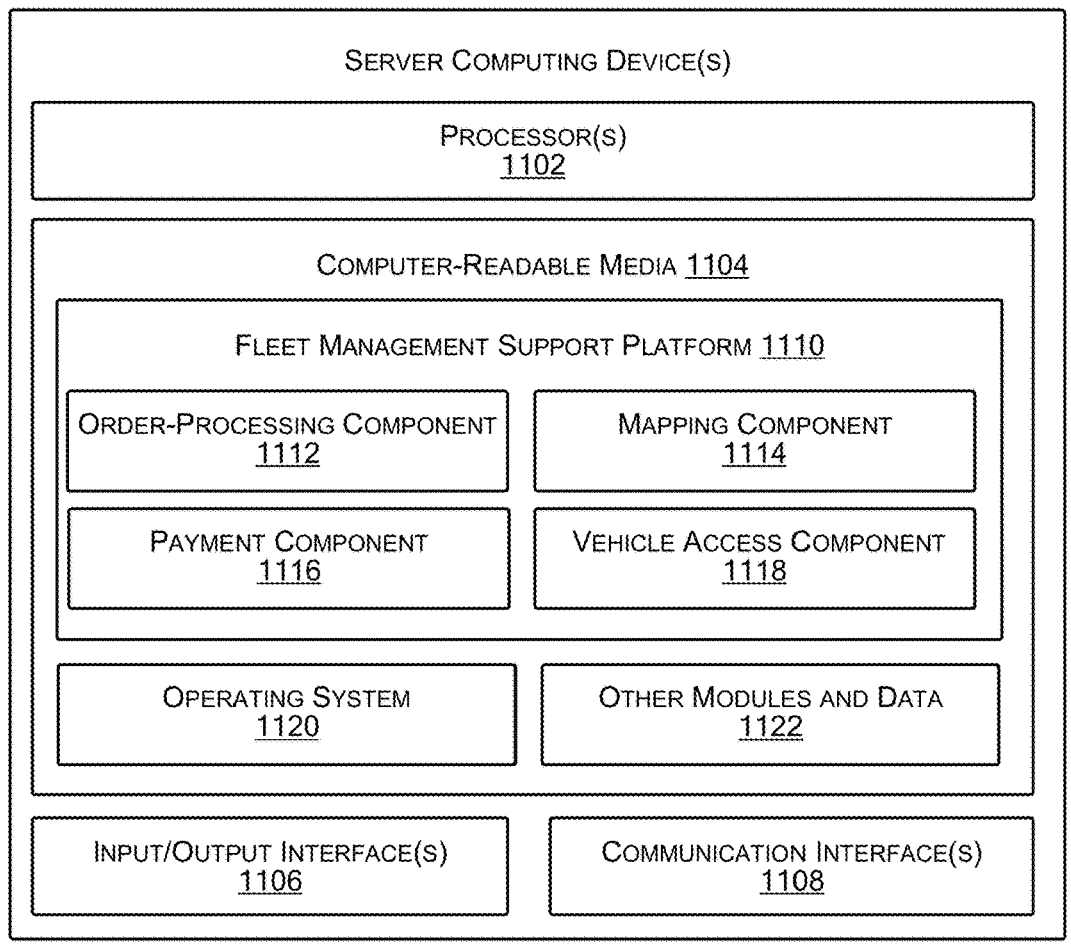
FIG. 11 illustrates an example server computing device of a package delivery system.

FIG. 11 illustrates an example server computing device 1100, such as server computing device 102, for use in an optimized package delivery system. The server computing device 1100 may be any suitable type of computing device, e.g., mobile, semi-mobile, semi-stationary, or stationary. The server computing device 1100 may belong to a variety of categories or classes of devices such as traditional server-type devices, desktop computer-type devices, mobile devices, special purpose-type devices, embedded-type devices, and/or wearable-type devices. Thus, server computing device 1100 may include a diverse variety of device types and are not limited to a particular type of device. For example, the server-computing device 1100 may represent, but is not limited to, desktop computers, server computers or blade servers such as web-servers, map-reduce servers, or other computation engines or network-attached storage units, personal computers, mobile computers, laptop computers, tablet computers, telecommunication devices, network enabled televisions, thin clients, terminals, personal data assistants (PDAs), game consoles, gaming devices, work stations, media players, personal video recorders (PVRs), set-top boxes, cameras, integrated components for inclusion in a computing device, appliances, or any other sort of computing device capable of sending communications and performing the functions according to the techniques described herein.

In the illustrated example, the server computing device 1100 includes at least one processor 1102, at least one memory 1104, one or more input/output (I/O) interfaces 1106, one or more communication interfaces 1108. Each processor 1102 can itself comprise one or more processors or processing cores. For example, the processor 1102 may be implemented as one or more microprocessors, microcomputers, microcontrollers, digital signal processors, central processing units, state machines, logic circuitries, and/or any devices that manipulate signals based on operational instructions. In some cases, the processor 1102 may be one or more hardware processors and/or logic circuits of any suitable type specifically programmed or configured to execute the algorithms and processes described herein. The processor 1102 may be configured to fetch and execute computer-readable processor-executable instructions stored in the memory 1104.

Depending on the configuration of the server computing device 1100, the memory 1104 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 1104 may include, but is not limited to, RAM, ROM, EEPROM, flash memory, solid-state storage, magnetic disk storage, optical storage, and/or other computer-readable media technology. Further, in some cases, the server computing device 1100 may access external storage, such as RAID storage systems, storage arrays, network attached storage, storage area networks, cloud storage, or any other medium that may be used to store information and that may be accessed by the processor 1102 directly or through another computing device or network. Accordingly, the memory 1104 may be computer storage media able to store instructions, modules or components that may be executed by the processor 1102. Further, when mentioned, non-transitory computer-readable media exclude media such as energy, carrier signals, electromagnetic waves, and signals per se.

The memory 1104 may be used to store and maintain any number of functional components that are executable by the processor 1102. In some implementations, these functional components comprise instructions or programs that are executable by the processor 1102 and that, when executed, implement operational logic for performing the actions and servers attributed above to the server computing device 1100. Functional components of the server computing device 1100 stored in the memory 1104 may include a fleet management support platform 1110, such as fleet management support platform 116, including an order-processing component 1112, a mapping component 1114, a payment component 1116, and a vehicle access component 1118.

The order-processing module 1112 may receive an order from a consumer via a consumer computing device. The order may include an item for purchase. In some examples, the order may include a scheduled order for delivery, such as an order associated with a package corresponding to a delivery route and/or delivery person (e.g., operator). In some examples, the order may include an unscheduled order for delivery. An unscheduled order may include an order received after a delivery vehicle has been loaded and deployed along a delivery route. An unscheduled order may include a frequently purchased item. In some examples, the delivery vehicle may be loaded with packages containing scheduled orders and packages containing frequently purchased items. In such examples, the order-processing module 1112 may be configured to receive an unscheduled order, determine that the delivery vehicle contains a package corresponding to the frequently purchased item included in the unscheduled order, determine that a delivery route is proximate a delivery location corresponding to the unscheduled order, and cause the operator to deliver the package to the delivery location, such as is described herein.

The mapping component 1114 may be configured to determine an initial delivery route associated with the delivery vehicle based on delivery locations associated with the operator and/or a first delivery route and/or conditions in the operating environment. In various examples, the mapping component 1114 may be configured to monitor current environmental conditions in the operating environment and a location associated with the vehicle, such as received from a location component of a vehicle computing device, and generate an updated delivery route based on the current environmental conditions. In some examples, the mapping component 1114 may receive a fuel amount and/or battery charge and may determine that the fuel amount and/or battery charge is less than a threshold amount. In such examples, the mapping component may be configured to generate an updated delivery route to include a stop at a fueling station, as described herein.

The payment component 1116 may be configured to determine proximity of the delivery vehicle to a pump at the fueling station. Based on the proximity (e.g., less than a threshold distance), the payment component 1116 may coordinate payment for a transaction for fuel and/or battery charge. In various examples, the payment component 1116 may enable a payment application or payment user interface of a delivery application on an operator computing device to initialize payment authorization (e.g., to request payment for a particular amount associated with the transaction). In some examples, the payment component 1116 may be configured to communicate with a computing device associated with the fueling station to facilitate payment for the fueling and/or charging event.

The vehicle access component 1118 may be configured to communicate with the vehicle computing device and/or an operator computing device to cause the vehicle to be unlocked. As described herein, the vehicle computing device may send the vehicle access component 1118 an indication that an operator is within a threshold distance of the vehicle. The indication may include an operator identifier associated with the operator. In some examples, the vehicle access component 1118 may receive the operator identifier and determine that the operator is scheduled to operate the vehicle at a current time or within a threshold time of the current time. In some examples, the vehicle access component 1118 may determine that the operator is within a threshold distance of the vehicle based on receiving a location associated with the vehicle, such as from a location component of the vehicle computing device and a location associated with the operator, such as from a location component of the operator computing device.

In some examples, based on a determination that the operator is within a threshold distance of the vehicle and/or is scheduled to operate the vehicle, the vehicle access component 1118 may cause a user interface to surface on the operator computing device. The user interface may include a selectable option for the operator to select in order to indicate an intent to access the vehicle, such as to perform a delivery route and/or work shift. Responsive to receiving an indication of selection of the selectable option, the vehicle access component 1118 may send an instruction to the vehicle computing device to transmit an unlock signal.

Additional functional components may include an operating system 1120 for controlling and managing various functions of the server computing device 1100. The memory 1104 may also store other modules and data 1122, which may include programs, drivers, etc., and the data used or generated by the functional components, to enable efficient and effective food order processing. In various examples, the other modules and data 1122 may include one or more drive systems and/or computing systems configured to operate an autonomous delivery vehicle. Further, the server computing device 1100 may include many other logical, programmatic and physical components, of which those described are merely examples that are related to the discussion herein. In addition, the memory 1104 may also store data, data structures and the like, that are used by the functional components.

The I/O interface(s) 1106, may include speakers, a microphone, a camera, and various user controls (e.g., buttons, a joystick, a keyboard, a keypad, etc.), a haptic output device, and so forth. The communication interface(s) 1108 may include one or more interfaces and hardware components for enabling communication with various other devices over the network or directly. For example, communication interface(s) 1108 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

Figure 12:
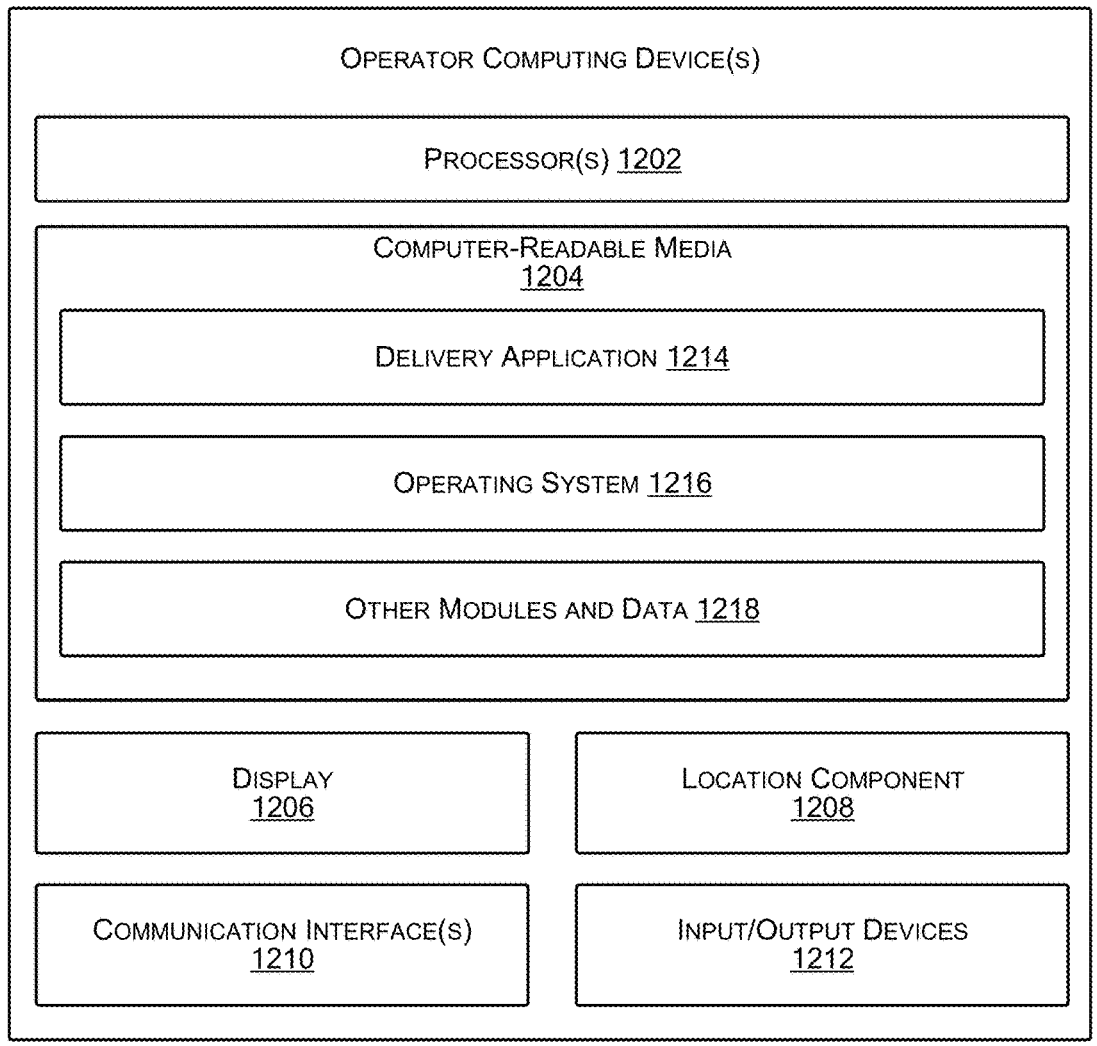
FIG. 12 illustrates an example operator computing device of a package delivery system.

FIG. 12 illustrates an example operator computing device 1200 for use in an optimized package delivery system. The operator computing device 1200 may be any suitable type of computing device, e.g., mobile, semi-mobile, semi-stationary, or stationary. Some examples of the operator computing device 1200 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the operator computing device 1200 includes at least one processor 1202, at least one memory 1204, a display 1206, a location component 1208, one or more communication interfaces 1210, and one or more input/output (I/O) interfaces 1212. Each processor 1202 can itself comprise one or more processors or processing cores. For example, the processor 1202 may be implemented as one or more microprocessors, microcomputers, microcontrollers, digital signal processors, central processing units, state machines, logic circuitries, and/or any devices that manipulate signals based on operational instructions. In some cases, the processor 1202 may be one or more hardware processors and/or logic circuits of any suitable type specifically programmed or configured to execute the algorithms and processes described herein. The processor 1202 may be configured to fetch and execute computer-readable processor-executable instructions stored in the memory 1204.

Depending on the configuration of the operator computing device 1200, the memory 1204 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 1204 may include, but is not limited to, RAM, ROM, EEPROM, flash memory, solid-state storage, magnetic disk storage, optical storage, and/or other computer-readable media technology. Further, in some cases, the operator computing device 1200 may access external storage, such as RAID storage systems, storage arrays, network attached storage, storage area networks, cloud storage, or any other medium that may be used to store information and that may be accessed by the processor 1202 directly or through another computing device or network. Accordingly, the memory 1204 may be computer storage media able to store instructions, modules or components that may be executed by the processor 1202. Further, when mentioned, non-transitory computer-readable media exclude media such as energy, carrier signals, electromagnetic waves, and signals per se.

The memory 1204 may be used to store and maintain any number of functional components that are executable by the processor 1202. In some implementations, these functional components comprise instructions or programs that are executable by the processor 1202 and that, when executed, implement operational logic for performing the actions and services attributed above to the operator computing device 1200. Functional components of the operator computing device 1200 stored in the memory 1204 may include a delivery application 1214, discussed above. The delivery application 1214 may present an interface on the operator computing device 1200 to enable the operator to access a schedule and/or details regarding assigned delivery duties. Further, the delivery application 1214 may present an interface to facilitate navigation along a delivery route, such as by causing a map to be displayed on the display 1206 and/or a display associated with the vehicle. In some examples, the delivery application 1214 may include a payment component configured to facilitate the purchase of fuel and/or battery charge at a fueling station. Additional functional components may include an operating system 1216 for controlling and managing various functions of the operator computing device 1200 and for enabling basic user interactions with the operator computing device 1200.

In addition, the memory 1204 may store data, data structures and the like, that are used by the functional components. For example, this data may include item information that includes information about the items offered by the merchant, which may include images of the items, descriptions of the items, prices of the items, and so forth. Depending on the type of the operator computing device 1200, the memory 1204 may also optionally include other modules and data 1218, which may include programs, drivers, etc., and the data used or generated by the functional components. Further, the operator computing device 1200 may include many other logical, programmatic and physical components, of which those described are merely examples that are related to the discussion herein.

FIG. 12 further illustrates that the operator computing device 1200 may include the display 1206 mentioned above. Depending on the type of computing device used as the operator computing device 1200, the display 1206 may employ any suitable display technology. For example, the display 1206 may be a liquid crystal display, a plasma display, a light emitting diode display, an OLED (organic light-emitting diode) display, an electronic paper display, or any other suitable type of display able to present digital content thereon. In some examples, the display 1206 may have a touch sensor associated with the display 1206 to provide a touchscreen display configured to receive touch inputs for enabling interaction with a graphical user interface presented on the display 1206. Accordingly, implementations herein are not limited to any particular display technology.

In various examples, the location component 1208 may include a GPS subsystem including a device to provide location information. In some examples, the location component 1208 may comprise a non-GPS based location-based sensor. The operator computing device 1200 may also include one or more additional sensors (not shown), such as an accelerometer, gyroscope, compass, proximity sensor, and the like. Additionally, the operator computing device 1200 may include various other components that are not shown, examples of which include removable storage, a power control unit, and so forth.

The one or more network interface(s) 1210 may include one or more interfaces and hardware components for enabling communication with various other devices over the network or directly. For example, network interface(s) 1210 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The I/O interfaces 1212, meanwhile, may include speakers, a microphone, a camera, and various user controls (e.g., buttons, a joystick, a keyboard, a keypad, etc.), a haptic output device, and so forth.

Figure 13:
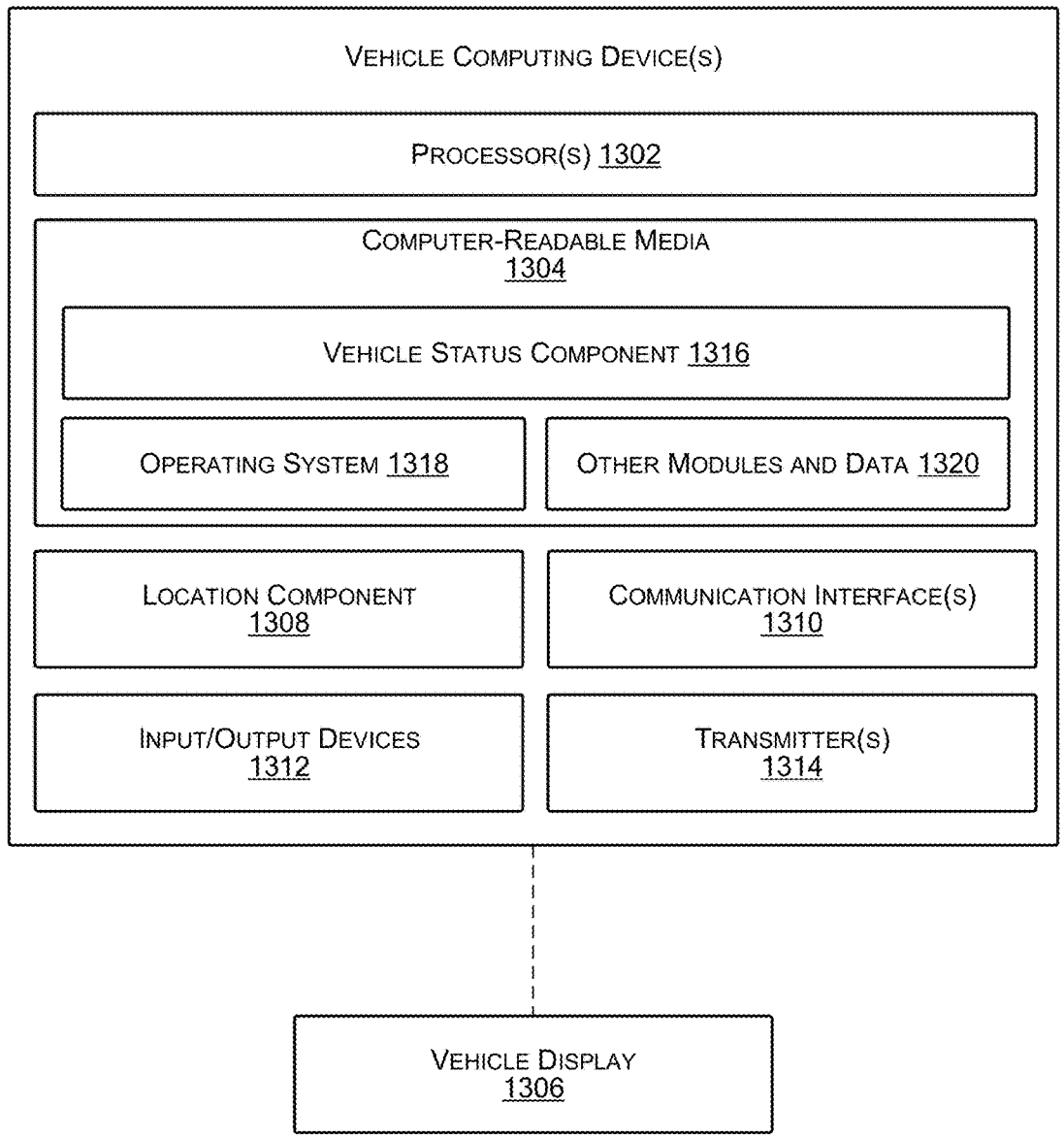
FIG. 13 illustrates an example vehicle computing device of a package delivery system.

FIG. 13 illustrates an example vehicle computing device 1300 for use in an optimized package delivery system. The vehicle computing device 1300 may be any suitable type of computing device, e.g., mobile, semi-mobile, semi-stationary, or stationary. Some examples of the vehicle computing device 1300 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein. In at least one example, the vehicle computing device 1300 may be configured to couple to a vehicle via an onboard diagnostics (OBD) port.

In the illustrated example, the vehicle computing device 1300 includes at least one processor 1302, at least one memory 1304, a vehicle display 1306, a location component 1308, one or more communication interfaces 1310, one or more input/output (I/O) interfaces 1312, and one or more transmitters 1314. Each processor 1302 can itself comprise one or more processors or processing cores. For example, the processor 1302 may be implemented as one or more microprocessors, microcomputers, microcontrollers, digital signal processors, central processing units, state machines, logic circuitries, and/or any devices that manipulate signals based on operational instructions. In some cases, the processor 1302 may be one or more hardware processors and/or logic circuits of any suitable type specifically programmed or configured to execute the algorithms and processes described herein. The processor 1302 may be configured to fetch and execute computer-readable processor-executable instructions stored in the memory 1304.

Depending on the configuration of the vehicle computing device 1300, the memory 1304 may be an example of tangible non-transitory computer storage media and may include volatile and nonvolatile memory and/or removable and non-removable media implemented in any type of technology for storage of information such as computer-readable processor-executable instructions, data structures, program modules or other data. The memory 1304 may include, but is not limited to, RAM, ROM, EEPROM, flash memory, solid-state storage, magnetic disk storage, optical storage, and/or other computer-readable media technology.

Further, in some cases, the vehicle computing device 1300 may access external storage, such as RAID storage systems, storage arrays, network attached storage, storage area networks, cloud storage, or any other medium that may be used to store information and that may be accessed by the processor 1302 directly or through another computing device or network. Accordingly, the memory 1304 may be computer storage media able to store instructions, modules or components that may be executed by the processor 1302. Further, when mentioned, non-transitory computer-readable media exclude media such as energy, carrier signals, electromagnetic waves, and signals per se.

The memory 1304 may be used to store and maintain any number of functional components that are executable by the processor 1302. In some implementations, these functional components comprise instructions or programs that are executable by the processor 1302 and that, when executed, implement operational logic for performing the actions and services attributed above to the vehicle computing device 1300. Functional components of the vehicle computing device 1300 stored in the memory 1304 may include a vehicle status component 1316 configured to provide the server computing device with one or more vehicle conditions and/or location data determined by the location component 1308, such as that discussed above. Additional functional components may include an operating system 1318 for controlling and managing various functions of the vehicle computing device 1300 and for enabling basic user interactions with the vehicle computing device 1300.

In addition, the memory 1304 may store data, data structures and the like, that are used by the functional components. For example, this data may include item information that includes information about the items offered by the merchant, which may include images of the items, descriptions of the items, prices of the items, and so forth. Depending on the type of the vehicle computing device 1300, the memory 1304 may also optionally include other modules and data 1310, which may include programs, drivers, etc., and the data used or generated by the functional components. Further, the vehicle computing device 1300 may include many other logical, programmatic and physical components, of which those described are merely examples that are related to the discussion herein.

FIG. 13 further illustrates that the vehicle computing device 1300 may include the vehicle display 1306 mentioned above. As illustrated, the vehicle display 1306 may include a display that is remote from the vehicle computing device, coupled via a wired and/or wireless connection. The display 1306 may employ any suitable display technology, such as a liquid crystal display, a plasma display, a light emitting diode display, an OLED (organic light-emitting diode) display, an electronic paper display, or any other suitable type of display able to present digital content thereon. In some examples, the vehicle display 1306 may have a touch sensor associated with the vehicle display 1306 to provide a touchscreen display configured to receive touch inputs for enabling interaction with a graphical user interface presented on the vehicle display 1306. Accordingly, implementations herein are not limited to any particular display technology.

In various examples, the location component 1308 may include a GPS subsystem including a device to provide location information. In some examples, the location component 1308 may comprise a non-GPS based location-based sensor. The vehicle computing device 1300 may also include one or more additional sensors (not shown), such as an accelerometer, gyroscope, compass, proximity sensor, and the like. Additionally, the vehicle computing device 1300 may include various other components that are not shown, examples of which include removable storage, a power control unit, and so forth.

The one or more communication interface(s) 1310 may include one or more interfaces and hardware components for enabling communication with various other devices over the network or directly. For example, communication interface(s) 1310 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The I/O interfaces 1312, meanwhile, may include speakers, a microphone, a camera, and various user controls (e.g., buttons, a joystick, a keyboard, a keypad, the vehicle display 1306, etc.), a haptic output device, and so forth.

The transmitter(s) 1314 may be configured to transmit one or more signals. In some examples, the transmitter(s) 1314 may transmit one or more Bluetooth signals, such as for operator identification and/or determination of operator proximity. In some examples, the Bluetooth signals may be continuously transmitted. In some examples, the Bluetooth signals may be transmitted based on a speed of the vehicle. In such examples, the Bluetooth signals may be transmitted based on a determination that the vehicle is less than a threshold speed (e.g., less than 1 mile per hour, less than 1 kilometer per hour, etc.).

In some examples, the transmitter(s) 1314 may be configured to transmit radio frequency signals including an unlock code associated with the vehicle. In such examples, the transmitter may be configured to transmit one or more signals at a frequency, amplitude, and/or with a code specific to an unlock function of the vehicle. In some examples, the transmitter(s) 1314 may transmit the radio frequency signal responsive to receiving an instruction to unlock the vehicle (e.g., cause the vehicle to unlock).

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   computer-readable media storing computer-executable instructions that, when executed by the one or more processors, cause the one or more processors to perform acts comprising:
   generating a first delivery route for delivering a first set of packages associated with a first operator via a delivery vehicle, the delivery vehicle including the first set of packages and a second set of packages associated with a second operator;
   sending the first delivery route to at least one of a vehicle computing device associated with the delivery vehicle or a first operator computing device associated with the first operator;

determining that the first delivery route is complete;

determining a parking location for the delivery vehicle;

sending location data indicating the parking location to the at least one of the vehicle computing device or the first operator computing device to direct the delivery vehicle to the parking location;

sending the location data to a second operator computing device associated with the second operator to cause the second operator to travel to the parking location to access the delivery vehicle and deliver the second set of packages;

receiving, from the vehicle computing device, an indication that the vehicle computing device determined that the second operator computing device is within a geo-fence area generated by the vehicle computing device;

based on the indication that the vehicle computing device determined that the second operator computing device is within the geo-fence area generated by the vehicle computing device, causing a user interface to surface on the second operator computing device, the user interface comprising a selectable option enabling the second operator to signal an intent to access the delivery vehicle;

receiving, from the second operator computing device, an indication that the second operator selected the selectable option via the user interface; and causing the vehicle computing device to transmit a signal to unlock the delivery vehicle to provide access to the second operator to operate the delivery vehicle on a second delivery route to deliver the second set of packages.

2. The system of claim 1, wherein the vehicle computing device is coupled to the delivery vehicle via an onboard diagnostics port of the delivery vehicle.

3. The system of claim 1, the acts further comprising:
receiving, from the vehicle computing device, an indication of an amount of fuel remaining in the delivery vehicle;

determining that the amount of fuel is below a threshold amount;

identifying a fueling station is within a first threshold distance of the first delivery route;

generating an updated delivery route including a stop at the fueling station;

determining that the delivery vehicle is less than a second threshold distance from a pump associated with the fueling station;

causing a payment interface to surface on the first operator computing device;

receiving a request to authorize a transaction for a fuel purchase at the pump; and sending, to a computing device associated with the fueling station, an authorization for the fuel purchase.

4. The system of claim 1, the acts further comprising:
identifying a traffic delay along the first delivery route;
generating an updated delivery route to avoid the traffic delay; and
sending the updated delivery route to the at least one of the vehicle computing device or the first operator computing device.

5. The system of claim 1, the acts further comprising:
receiving an order for a frequently purchased item, wherein the frequently purchased item is an item that is purchased a predetermined number of times over a predetermined time period;

determining that the frequently purchased item is on the delivery vehicle;

determining that a delivery location associated with the order is within a threshold distance of the first delivery route;

generating an updated delivery route to include a stop at the delivery location to deliver the frequently purchased item; and sending the updated delivery route to the at least one of or the vehicle computing device or the first operator computing device.

6. A method comprising:
sending, to a first operator computing device associated with a first operator of a vehicle comprising packages for delivery, a route for delivering at least a first portion of the packages;

determining that the route is complete;

determining a parking location for the vehicle;

sending location data indicating the parking location to the first operator computing device and a second operator computing device associated with a second operator;

receiving, from a vehicle computing device associated with the vehicle, an indication that the vehicle computing device determined that the second operator computing device is within a geo-fence area generated by the vehicle computing device;

based at least in part on the indication that the vehicle computing device determined that the second operator computing device is within the geo-fence area generated by the vehicle computing device, causing output of data via the second operator computing device, the data indicating an option enabling the second operator to signal an intent to access the vehicle;

receiving, from the second operator computing device, an indication that the second operator indicated the option; and causing the vehicle computing device to transmit a signal to unlock the vehicle to provide access to the second operator to operate the vehicle and deliver at least a second portion of the packages.

7. The method of claim 6, further comprising:
identifying a traffic delay along the route;
generating an updated route to avoid the traffic delay; and
sending the updated route to the first operator computing device.

8. The method of claim 6, further comprising:
receiving, from the vehicle computing device, an indication of an amount of fuel or charge remaining in the vehicle;

determining that the amount of fuel is equal to or less than a threshold amount;

identifying a fueling station proximate the route; and generating an updated route including a stop at the fueling station.

9. The method of claim 8, wherein the threshold amount is based at least in part on at least one of:
a predetermined amount of fuel or charge;
a predetermined number of miles the vehicle can operate prior to refueling or recharging;
a number of fueling stations in an operating environment of the vehicle;
an average distance between fueling stations in the operating environment; or a number of fueling stations configured to communicate with at least one of the vehicle or the first operator computing device to coordinate payment for fuel or a charge.

10. The method of claim 8, further comprising:
determining that the vehicle is less than a threshold distance from a fuel pump or a battery charger associated with the fueling station;
causing a payment interface to surface on the first operator computing device;
receiving a request to authorize a transaction for a purchase at the fuel pump or battery charger; and
sending, to a computing device associated with the fueling station, an authorization for the purchase.

11. The method of claim 6, further comprising:
receiving an order for an item;
determining that the item is on the vehicle;
determining that a delivery location associated with the order is within a threshold distance of the route;
generating an updated route to include a stop at the delivery location to deliver the item; and
sending the updated route to the first operator computing device.

12. The method of claim 11, wherein the item comprises a frequently purchased item, the method further comprising:
identifying one or more items that are frequently purchased in an operating environment of the vehicle; and
causing the frequently purchased item to be loaded into the vehicle to enable an unscheduled delivery of the frequently purchased item.

13. The method of claim 6, further comprising:
determining that the second operator is scheduled to operate the vehicle subsequent to the first operator; and
sending an identifier associated with the second operator to the vehicle computing device,
wherein the indication that the vehicle computing device determined that the second operator computing device is within the geo-fence area generated by the vehicle computing device includes the identifier associated with the second operator.

14. The method of claim 6, wherein the indication that the vehicle computing device determined that the second operator computing device is within the geo-fence area generated by the vehicle computing device is based at least in part on the vehicle computing device receiving a signal comprising an identifier associated with the second operator.

15. The method of claim 6, wherein determining that the route is complete is based at least in part on at least one of:
an indication that a final package of a first portion of packages associated with the first operator has been delivered; or
a time associated with a completion of a work shift of the first operator.

16. One or more non-transitory computer-readable media storing executable instructions that, when executed, cause one or more computing devices to perform acts comprising:
sending, to a first operator computing device associated with a first operator of a vehicle comprising packages for delivery, a route for delivering at least a first portion of the packages;
determining that the route is complete;
determining a parking location for the vehicle;
sending location data indicating the parking location to the first operator computing device and a second operator computing device associated with a second operator;
receiving, from a vehicle computing device associated with the vehicle, an indication that the vehicle computing device determined that the second operator computing device is within a geo-fence area generated by the vehicle computing device;
based at least in part on the indication that the vehicle computing device determined that the second operator computing device is within the geo-fence area generated by the vehicle computing device, causing output of data via the second operator computing device, the data indicating an option enabling the second operator to signal an intent to access the vehicle;
receiving, from the second operator computing device, an indication that the second operator indicated the option; and
causing the vehicle computing device to transmit a signal to unlock the vehicle to provide access to the second operator to operate the vehicle.

17. The one or more non-transitory computer-readable media of claim 16, wherein the vehicle computing device is coupled to the vehicle via an onboard diagnostics port.

18. The one or more non-transitory computer-readable media of claim 16, the acts further comprising receiving a condition associated with the vehicle from the vehicle computing device.

19. The one or more non-transitory computer-readable media of claim 18, wherein the condition comprises at least one of:
an amount of fuel;
a battery charge;
a tire pressure; or
an amount of oil.

20. The one or more non-transitory computer-readable media of claim 18, the acts further comprising:
generating second route for delivering at least a second portion of the packages based at least in part on the condition; and
sending the second route to the at least one of the vehicle computing device or the second operator computing device.

* * * * *